US008643679B2

(12) United States Patent
Ohnishi et al.

(10) Patent No.: US 8,643,679 B2
(45) Date of Patent: Feb. 4, 2014

(54) STORAGE MEDIUM STORING IMAGE CONVERSION PROGRAM AND IMAGE CONVERSION APPARATUS

(75) Inventors: Naonori Ohnishi, Kyoto (JP); Takako Ishii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 879 days.

(21) Appl. No.: 12/155,341

(22) Filed: Jun. 3, 2008

(65) Prior Publication Data

US 2009/0251492 A1 Oct. 8, 2009

(30) Foreign Application Priority Data

Apr. 4, 2008 (JP) .................................. 2008-97948

(51) Int. Cl.
*G06T 11/60* (2006.01)

(52) U.S. Cl.
USPC ............................ 345/650; 345/661; 345/676

(58) Field of Classification Search
CPC ...................................................... G06T 11/60
USPC ................. 345/646–648, 650–654, 661–665, 345/676–680
See application file for complete search history.

(56) References Cited

U.S. PATENT DOCUMENTS 5,075,785 A * 12/1991 Sugishima .................... 358/448
2003/0058254 A1 3/2003 Dworsky et al.
2005/0248585 A1* 11/2005 Inoue et al. ................... 345/619

FOREIGN PATENT DOCUMENTS

| | | | |
|---|---|---|---|
| EP | 0 843 282 A1 | | 5/1998 |
| EP | 0 945 831 A1 | | 9/1999 |
| GB | 2 277 226 A | | 10/1994 |
| JP | 4-328687 | | 11/1992 |
| JP | 2004-265168 | * | 9/2004 |
| JP | 2005-346044 A | | 12/2005 |

OTHER PUBLICATIONS

AutoCad Tutorials, Tutorials—Basic AutoCAD—Lesson 6—Basic Modify Commands; Inernet Archive for http://autocadcentral.com/Tutorials/Lesson%206/lesson6.htm on Jul. 24, 2003, pp. 1-11.*
Extended European Search Report mailed Jan. 30, 2013 in European Application No. 08009717.3 (7 pages).
Pickover et al., "Electronic Kaleidoscopes for the Mind," Computer Graphics Forum, Wiley-Blackwell Publishing Ltd., Great Britain, vol. 12, No. 1, Jan. 1, 1993, pp. 41-46.
Notice of Reasons for Rejection mailed Mar. 21, 2012 in Japanese Appln. No. 2008-097948 with English Translation (3 pages).

* cited by examiner

*Primary Examiner* — Jeffery A Brier
(74) *Attorney, Agent, or Firm* — Nixon & Vanderhye P.C.

(57) ABSTRACT

An image conversion apparatus converts an image, and displays a converted image on a display device. The image conversion apparatus displays an original image before conversion on the display device. Next, the image conversion apparatus sets a dividing line 52 for dividing an image displayed on the display device into a first area 53 and a second area 54 by an instruction from a user. Next, the image conversion apparatus converts the original image by changing at least a part of an image of the first area 53 to an image generated from an image of the second area 52, and displays an image after the conversion on the display device.

10 Claims, 15 Drawing Sheets

12
P1 P2 Pa P3 P4
P5 P6 P7
P8 P9 P10 V P11
27
P12 P13 P14
P15 P16 P17 P18
Pb

67

| a \ b | 0 | 1 | 2 | 3 | 4 | 5 | 6 |
|---|---|---|---|---|---|---|---|
| 0 | P1(x1,y1) | NULL | P2(x2,y2) | NULL | P3(x3,y3) | NULL | P4(x4,y4) |
| 1 | NULL | P5(x5,y5) | NULL | P6(x6,y6) | NULL | P7(x7,y7) | NULL |
| 2 | P8(x8,y8) | NULL | P9(x9,y9) | NULL | P10(x10, y10) | NULL | P11(x11, y11) |
| 3 | NULL | P12(x12, y12) | NULL | P13(x13, y13) | NULL | P14(x14, y14) | NULL |
| 4 | P15(x15, y15) | NULL | P16(x16, y16) | NULL | P17(x17, y17) | NULL | P18(x18, y18) |

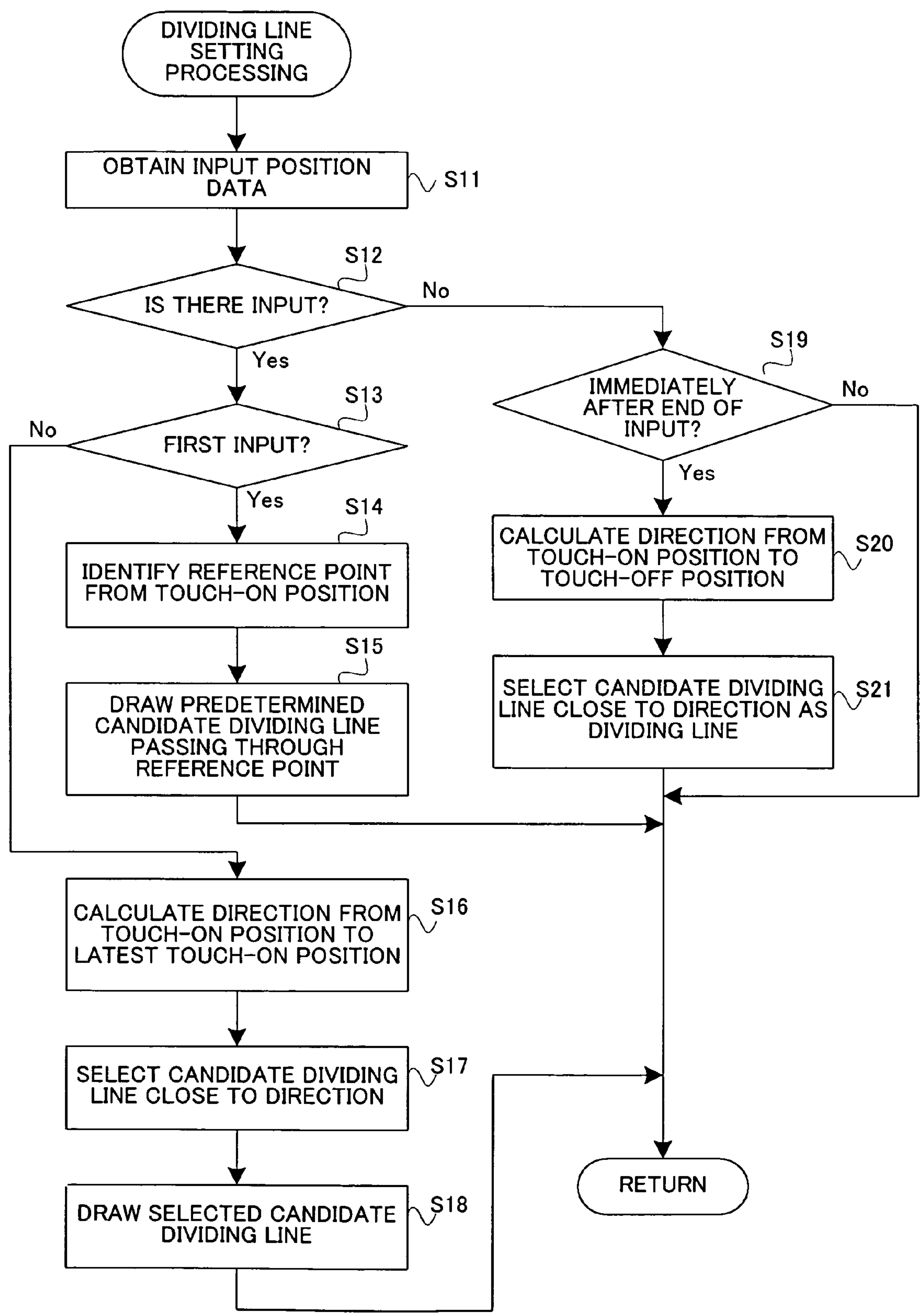
Fig. 11
DIVIDING LINE SETTING PROCESSING
OBTAIN INPUT POSITION DATA
S11
S12
IS THERE INPUT?
No
Yes
S13
FIRST INPUT?
No
Yes
S14
IDENTIFY REFERENCE POINT FROM TOUCH-ON POSITION
S15
DRAW PREDETERMINED CANDIDATE DIVIDING LINE PASSING THROUGH REFERENCE POINT
S19
IMMEDIATELY AFTER END OF INPUT?
No
Yes
CALCULATE DIRECTION FROM TOUCH-ON POSITION TO TOUCH-OFF POSITION
S20
SELECT CANDIDATE DIVIDING LINE CLOSE TO DIRECTION AS DIVIDING LINE
S21
CALCULATE DIRECTION FROM TOUCH-ON POSITION TO LATEST TOUCH-ON POSITION
S16
SELECT CANDIDATE DIVIDING LINE CLOSE TO DIRECTION
S17
DRAW SELECTED CANDIDATE DIVIDING LINE
S18
RETURN

| a \ b | 0 | 1 | 2 | 3 | 4 | 5 | 6 |
|---|---|---|---|---|---|---|---|
| 0 | P1(x1,y1) | NULL | P2(x2,y2) | NULL | P3(x3,y3) | NULL | P2(x2,y2) |
| 1 | NULL | P5(x5,y5) | NULL | P6(x6,y6) | NULL | P6(x6,y6) | NULL |
| 2 | P8(x8,y8) | NULL | P9(x9,y9) | NULL | P10(x10, y10) | NULL | P9(x9,y9) |
| 3 | NULL | P12(x12, y12) | NULL | P13(x13, y13) | NULL | P13(x13, y13) | NULL |
| 4 | P15(x15, y15) | NULL | P16(x16, y16) | NULL | P17(x17, y17) | NULL | P16(x16, y16) |

STORAGE MEDIUM STORING IMAGE CONVERSION PROGRAM AND IMAGE CONVERSION APPARATUS

CROSS REFERENCE TO RELATED APPLICATION

The disclosure of Japanese Patent Application No. 2008-97948, filed on Apr. 4, 2008, is incorporated herein by reference.

BACKGROUND AND SUMMARY

The present technology relates to an image conversion program and an image conversion apparatus, and more particularly, to an image conversion program and an image conversion apparatus for executing predetermined image conversion processing with respect to an image before conversion and displaying a converted image.

Patent Document 1 (Japanese Laid-Open Patent Publication No. 2004-265168) discloses an image generation apparatus for generating a bilaterally symmetrical (or vertically symmetrical) image. The image generation apparatus assumes, for example, an image of a face of an animal, and the like as an object to be processed, and converts the image into a bilaterally symmetrical image. More specifically, the image generation apparatus defines an eye area (an A area 110 and a B area 120 shown in FIG. 4 of Patent Document 1) and a nose area (a C area 130 shown in the same figure), and calculates a line as an axis for dividing an image into two images from these eye and nose areas. One of the two images divided by the calculated axis is converted into an image obtained by inverting the other image about the axis, thereby generating a bilaterally symmetrical image.

In the image generation apparatus described in the above Patent Document 1, a user cannot directly set a line (axis) for dividing an image into two images, and cannot set a line at a desired position and in a desired direction. Since the user cannot freely set a line, the user cannot obtain various images, and there is a problem that obtained images are uniform.

Therefore, a feature of an example embodiment presented herein is to provide an image conversion program and image conversion apparatus which allows the user to freely set a line for dividing an image, thereby obtaining various images as images after conversion.

The present embodiment has the following features to attain the above. It is noted that reference characters and supplementary explanations in parentheses in this section are merely provided to facilitate the understanding of the present embodiment in relation to the later-described embodiment, rather than limiting the scope of the present embodiment in any way.

A first aspect is a storage medium (a stored data memory 34 or a memory card 28) storing an image conversion program (61) which is executed by a computer (a CPU 31) of an image conversion apparatus (a game apparatus 10) which converts an image and displays a converted image on a display device (a lower LCD 12). The image conversion program causes the computer to execute an original image display step (S33), a dividing line setting step (S4), and a change step (S5). At the original image display step, the computer displays an original image before conversion on the display device. At the dividing line setting step, the computer sets a dividing line (52) for dividing an area of an image displayed on the display device into a first area (53) and a second area (54) by an instruction from a user. At the change step, the computer converts the original image by changing at least a part of an image of the first area to an image generated from an image of the second area, and displays an image after the conversion on the display device (FIG. 5).

In a second aspect, the image conversion apparatus may include a pointing device (a touch panel 13) capable of performing an input for designating a position on a screen of the display device. In this case, the image conversion program further causes the computer to execute an input obtaining step (S11) of obtaining an input position inputted by the pointing device. At the dividing line setting step, the computer sets the dividing line based on the input position obtained at the input obtaining step.

In a third aspect, the input obtaining step may be repeatedly executed every a predetermined time period. In this case, at the dividing line setting step, the computer sets the dividing line based on a plurality of input positions continuously obtained at the input obtaining step which is executed a plurality of times.

In a fourth aspect, the dividing line setting step may include a selection step (S14, S20, S21) of selecting the dividing line among a plurality of candidate dividing lines set on the screen based on the plurality of input positions.

In a fifth aspect, at the selection step, the computer may calculate a position and a direction on the screen from the plurality of input positions, and may select the dividing line among the candidate dividing lines based on the calculated position and direction.

In a sixth aspect, the plurality of candidate dividing lines may be set so as to extend through lattice points which are arranged on the screen in a lattice-like pattern (FIG. 7). In this case, at the selection step, the computer selects, among candidate dividing lines extending through a lattice point closest to a first input position among the plurality of input positions, a candidate dividing line having a tilt closest to a tilt of a straight line which connects the first input position and a second input position after the first input position among the plurality of input positions as the dividing line.

In a seventh aspect, at the selection step, the computer may set an input position (a touch-on position) which is first obtained among the plurality of input positions as the first input position, and may set an input position (a touch-off position) which is last obtained among the plurality of input positions as the second input position.

In an eighth aspect, the dividing line setting step may include a selection step (S21) of selecting the dividing line among a plurality of candidate dividing lines set on a screen of the display device in accordance with an instruction from the user.

In a ninth aspect, the image conversion program may further cause the computer to execute an object locating step (S1) of locating an object composed of a plurality of polygons in a virtual three-dimensional space such that when the object is displayed on the screen, the plurality of candidate dividing lines coincide with sides of the polygons (FIGS. 7 and 8). In this case, the image conversion apparatus stores association data (67) in which a position on the original image is associated with each top of the plurality of polygons. At the original image display step, the computer displays the original image by drawing the object using the original image as a texture in accordance with associations in the association data. At the change step, the computer converts the original image by changing the associations in the association data.

In a tenth aspect, the plurality of candidate dividing lines may be straight lines, and set such that when an image area is divided by any candidate dividing line, a position of each top of the polygons in a smaller area is line symmetrical to any of positions of tops of the polygons in a larger area about the candidate dividing line (FIGS. 7 and 8). In this case, at the change step, the computer changes the associations such that an image after the conversion is line symmetrical about the dividing line.

In an eleventh aspect, the plurality of candidate dividing lines may be straight lines, and set such that when at least one of two areas divided by any candidate dividing line is inverted about the candidate dividing line, the inverted area covers an entirety of the other area. In this case, at the change step, the computer converts the image of the first area such that an image after the conversion is line symmetrical about the dividing line.

In a twelfth aspect, at the dividing line setting step, the computer may set a straight line as the dividing line. In this case, at the change step, the computer changes the image of the first area such that an image after the conversion is line symmetrical about the dividing line.

In a thirteenth aspect, the change step may include a comparison step (S31) and a conversion performing step (S32). At the comparison step, the computer compares sizes of two areas divided by the dividing line. At the conversion performing step, the computer converts the original image with an area which is determined to be larger at the comparison step set as the second area.

In a fourteenth aspect, the image conversion program may further cause the computer to execute a determination step (S41) and a dividing line resetting step (S42). At the determination step, the computer determines whether or not an entirety of the first area is covered by the image of the second area which is inverted about the dividing line at the change step. At the dividing line resetting step, the computer sets a boundary line included in the first area among boundary lines of the inverted image of the second area as a new dividing line when it is determined at the determination step that a part of the first area is not covered by the inverted image of the second area. In this case, at the change step, the computer converts an image based on the set dividing line again when a dividing line is set at the dividing line resetting step.

In a fifteenth aspect, the image conversion program may cause the computer to repeatedly execute the dividing line setting step and the change step.

In a sixteenth aspect, the image conversion program may further cause the computer to execute an image obtaining step (S2) of repeatedly obtaining an image taken by imaging means (a camera 23 or 25) of the image conversion apparatus. In this case, at the original image display step, the computer uses the image taken by the imaging means of the image conversion apparatus as the original image. At the change step, the computer displays an image after the conversion on the display device with the obtained image used as the original image every time an image is obtained at the image obtaining step.

In a seventeenth aspect, the image conversion program may further cause the computer to execute an image storage step (S7) of storing an image displayed on the display device in storage means (the stored data memory 34) when an instruction to store an image is performed by the user.

Further, the present embodiment may be provided in a form of an image conversion apparatus having the same function as that of an image conversion apparatus which executes each of the steps in the first to seventeenth aspects. It is noted that in the image conversion apparatus, a CPU executing the image conversion program may execute each of the above steps, or a dedicated circuit of the image conversion apparatus may execute a part or an entirety of processing at each of the above steps.

According to the first aspect, since the dividing line is set at the dividing line setting step by the instruction from the user, the user can freely set a dividing line. Thus, the user can freely generate a conversion image, and can generate various images as conversion images.

According to the second aspect, the user can set the dividing line with the pointing device. Thus, the user can directly perform an input on the original image, and thus can intuitively perform an operation. Further, according to the third aspect, the user can set the dividing line by performing an input so as to draw a line. Thus, the user can set a dividing line as if the user directly inputted a dividing line with respect to the original image, and hence an operation manner capable of performing an intuitive operation and having an excellent operational feeling can be provided.

According to the fourth aspect, since the dividing line is selected among the candidate dividing lines, even when the user cannot successfully input a dividing line (e.g. even when the user cannot precisely input a straight line), a dividing line can be precisely set.

According to the fifth aspect, since the dividing line is selected based on the position and the direction of the line drawn on the screen by the user, a candidate dividing line according to user's intention can be precisely selected.

According to the sixth aspect, by using two input positions, a dividing line according to user's intention can be selected. Particularly, according to the seventh aspect, by setting a position at which an input is started as the first input position and a position at which the input is finished as the second input position, a position and a direction according to user's intention can be precisely extracted from a line drawn by the user.

According to the eighth aspect, since the dividing line is selected among the candidate dividing lines, the user can easily set a dividing line.

According to the ninth aspect, by locating the polygons composing the object so as to coincide with the candidate dividing lines, an image can be easily changed. In other words, the computer can easily change an image by changing the associations of the tops of the polygons with the positions on the screen.

According to the tenth aspect, when the associations are changed at the change step, the computer can change a position on the original image which is associated with a top to a position on the original image which is associated with another top. Thus, the computer can easily calculate an association after the change.

According to the eleventh aspect, by changing the image of the smaller area among the areas divided by the dividing line to the image obtained by inverting the image of the larger area, continuity of an image after the conversion can be maintained.

According to the twelfth aspect, an image which is line symmetrical about the dividing line can be generated by the image conversion processing.

According to the thirteenth aspect, since the image of the smaller area is overwritten with the image obtained by inverting the image of the larger area, it is more likely to maintain continuity of an image after the conversion.

According to the fourteenth aspect, since image conversion is executed again when continuity of an image after the conversion is lost, an image which maintains its continuity can be finally and reliably obtained.

According to the fifteenth aspect, since the user can set the dividing line with respect to the image after the conversion, the image conversion processing can be repeatedly executed.

By repeatedly executing the image conversion processing, more various images can be generated.

According to the sixteenth aspect, the image conversion processing can be executed with respect to an image (a moving image) which is taken by the user and changed in real time, and the image which has been subjected to the image conversion processing can be displayed. Further, according to the seventeenth aspect, the image after the image conversion processing can be stored.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 11 is a flow chart showing a procedure of dividing line setting processing (a step S4) shown in FIG. 10;

FIG. 15 is a view showing an example of the association data 67 after change;

DESCRIPTION OF THE PREFERRED EMBODIMENTS

Configuration of Game Apparatus

Figure 1:
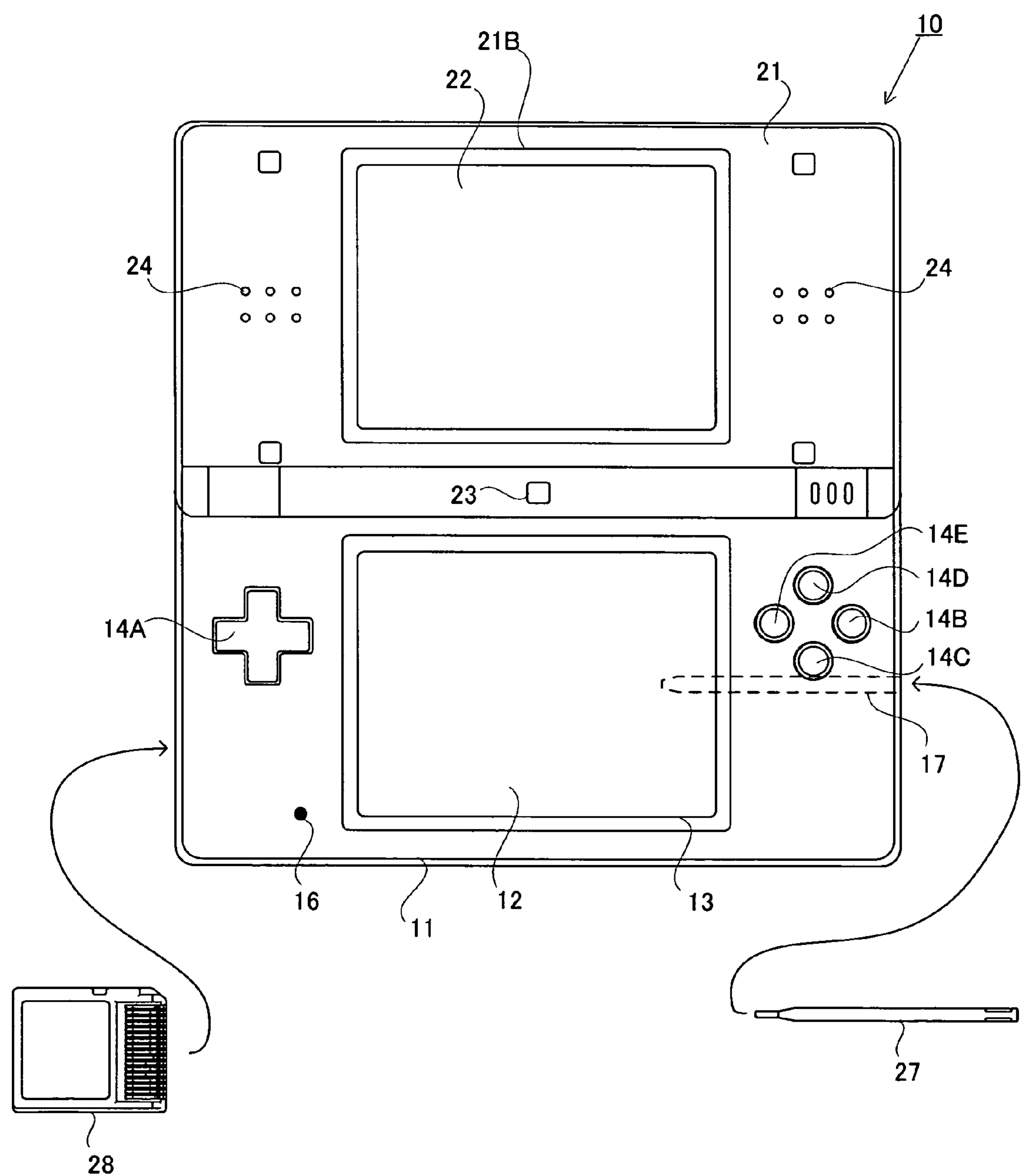
FIG. 1 is an external view of a game apparatus 10.

The following will describe a hand-held game apparatus as an example of an image conversion apparatus according to an embodiment. FIG. 1 is an external view of a game apparatus 10. The hand-held game apparatus 10 shown in FIG. 1 takes an image by imaging means (a camera), displays the taken image on a screen, stores data of the taken image, and executes predetermined image conversion processing with respect to the taken image. In the present embodiment, the hand-held game apparatus which is a hand-held information processor is described as an example. However, the image conversion apparatus according to the present embodiment may be a stationary information processor. The following will describe an external configuration of the game apparatus 10 with reference to FIG. 1.

As shown in FIG. 1, the game apparatus 10 is a foldable game apparatus, and includes a lower housing 11 and an upper housing 21. The lower housing 11 and the upper housing 21 are connected to each other so as to be capable of being opened or closed (foldable).

The game apparatus 10 includes an upper LCD (Liquid Crystal Display) 22 and a lower LCD 12. The upper LCD 22 is mounted in the upper housing 21, and the lower LCD 12 is mounted in the lower housing 11. It is noted that although an LCD is used as a display device in the present embodiment, any other display devices such as a display device using an EL (Electro Luminescence) may be used. In addition, the game apparatus 10 can use a display device of any resolution. In the present embodiment, the game apparatus 10 includes two display devices. However, in an alternative embodiment, the image conversion apparatus (the game apparatus) may include any number of display devices.

The game apparatus 10 includes a speaker (not shown) as sound output means. The speaker is accommodated in the upper housing 21. The upper housing 21 is provided with sound holes 24 for releasing sound from the speaker therethrough.

The game apparatus 10 includes inner and outer cameras 23 and 25 (FIG. 2) as the imaging means. Each of the cameras 23 and 25 is accommodated in the upper housing 21. As shown in FIG. 1, the inner camera 23 is mounted in an inner surface of the upper housing 21 (a surface of the upper housing 21 which is located on the inside of the game apparatus 10 when the game apparatus 10 is closed). On the other hand, although not shown in the figures, the outer camera 25 is mounted in a surface opposite to the surface in which the inner camera 23 is mounted, namely, in an outer surface of the upper housing 21 (a surface of the upper housing 21 which is located on the outside of the game apparatus 10 when the game apparatus 10 is closed). Thus, in the present embodiment, the two cameras 23 and 25 are provided such that imaging directions thereof are opposite to each other. As a result, a user can take images in two different directions without changing a manner of holding the game apparatus 10. For example, the user can take an image of a view seen from the game apparatus 10 toward the user with the inner camera 23 as well as an image of a view seen from the game apparatus 10 in a direction opposite to the user with the outer camera 25.

The present embodiment describes, as an example, the case where the game apparatus 10 includes the two cameras 23 and 25 and executes image conversion processing with respect to an image taken by the camera 23 or 25. However, an image which is an object to be subjected to the image conversion processing may be obtained in any manner. The image which is the object to be subjected to the image conversion processing may be, for example, an image obtained from another apparatus via a network such as the Internet, and the like, an image obtained from a storage medium such as a memory card 28, and the like, or an image generated by an image generation operation by the user. Thus, the image conversion apparatus according to the present invention may not include an imaging device.

As shown in FIG. 1, the game apparatus 10 includes a plurality of buttons as input devices. The plurality of buttons includes a direction input button 14A, a button 14B, a button 14C, a button 14D, and a button 14E which are provided on an inner surface of the lower housing 11 (a surface of the lower housing 11 which is located on the inside of the game apparatus 10 when the game apparatus 10 is closed). The buttons 14A to 14E are used for performing various operations with respect to the game apparatus 10. Although not shown in the figures, a button, for example, for performing a photographing operation (a shutter operation) is provided at each end of an upper surface of the lower housing 11. A power button for turning on and off the power of the game apparatus 10 is provided, for example, on a right side surface of the lower housing 11. A volume button for adjusting the volume of the speaker of the game apparatus 10 is provided, for example, on a left side surface of the lower housing 11.

The game apparatus 10 further includes a touch panel 13 as another input device in addition to the above buttons. The touch panel 13 is mounted on a screen of the lower LCD 12. The touch panel 13 may be of any type such as a resistive film type, an optical type (infrared type), or a capacitive coupling type. The touch panel 13 used in the present embodiment has the same resolution (detection accuracy) as that of the lower LCD 12. However, the resolution of the touch panel 13 and the lower LCD 12 may not necessarily be the same as each other. A touch pen 27 is usually used for performing an input with respect to the touch panel 13, but a finger of the user can be used for operating the touch panel 13 instead of the touch pen 27. In the present embodiment, the game apparatus 10 determines a later-described dividing line in accordance with an input with respect to the touch panel 13. In the right side surface of the lower housing 11, an insertion opening 17 (indicated by a dotted line in FIG. 1) is provided for accommodating the touch pen 27.

The game apparatus 10 includes a microphone (a microphone 42 shown in FIG. 2) as a voice input device. The microphone 42 is accommodated in the lower housing 11. In the inner surface of the lower housing 11, a microphone hole 16 is provided to allow the microphone 42 to detect sound outside the game apparatus 10.

Although not shown in the figures, a cover is provided on the left side surface of the lower housing 11 so as to be capable of being opened or closed. Inside the cover, a connector (not shown) is provided for electrically connecting the game apparatus 10 to the memory card 28. The memory card 28 is detachably mounted to the connector. The memory card 28 is used, for example, for storing data of a taken image. Further, an image conversion program for executing later-described image conversion processing may be stored in the memory card 28.

[Internal Configuration of Game Apparatus 10]

Figure 2:
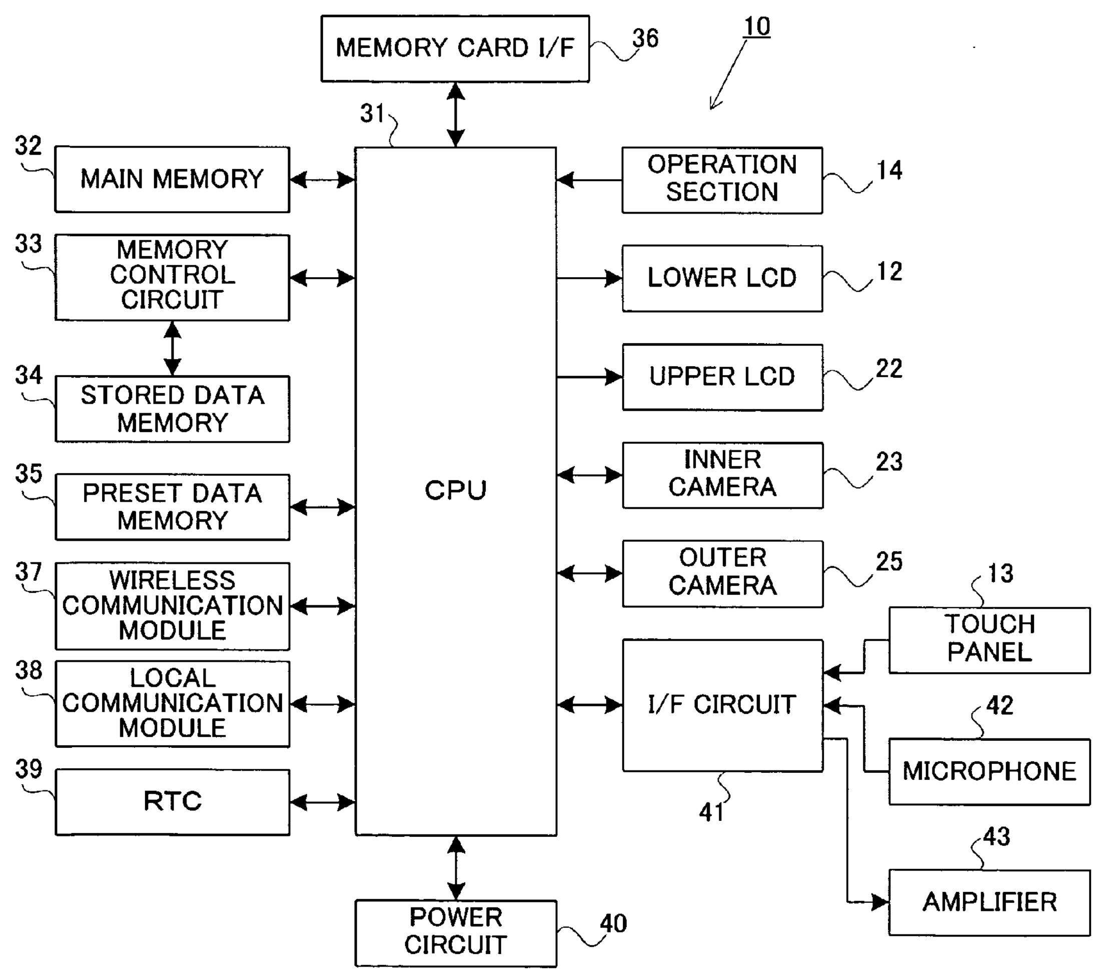
FIG. 2 is a block diagram showing an internal configuration of the game apparatus 10.

The following will describe an internal configuration of the game apparatus 10 with reference to FIG. 2. FIG. 2 is a block diagram showing the internal configuration of the game apparatus 10. As shown in FIG. 2, the game apparatus 10 includes electronic components including a CPU 31, a main memory 32, a memory control circuit 33, a stored data memory 34, a preset data memory 35, a memory card interface (memory card I/F) 36, a wireless communication module 37, a local communication module 38, a real time clock (RTC) 39, a power circuit 40, an interface circuit (I/F circuit) 41, and the like. These electronic components are mounted on an electronic circuit substrate and accommodated in the lower housing 11. It is noted that various electronic circuits and a battery of the game apparatus 10 may be accommodated in either the upper housing 21 or the lower housing 11.

The CPU 31 is information processing means for executing a predetermined program. In the present embodiment, the predetermined program is stored in a memory (e.g. the stored data memory 34) within the game apparatus 10, and the CPU 31 executes the later-described image conversion processing by executing the predetermined program. It is noted that the program executed by the CPU 31 may be stored in advance in a memory within the game apparatus 10, may be obtained from the memory card 28, or may be obtained from another apparatus by means of communication with the other apparatus.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores various data used in the image conversion processing, and also stores a program obtained from the outside (the memory card 28, another apparatus, and the like). In the present embodiment, for example, a PSRAM (Pseudo-SRAM) is used as the main memory 32. The stored data memory 34 is storage means for storing the program executed by the CPU 31, data of images taken by the cameras 23 and 25, and the like. The stored data memory 34 is constructed of, for example, a NAND flash memory. The memory control circuit 33 is a circuit for controlling reading of data from the stored data memory 34 or writing of data to the stored data memory 34 in accordance with an instruction from the CPU 31. The preset data memory 35 is storage means for storing data (preset data) of various parameters which are set in advance in the game apparatus 10, and the like. A flash memory connected to the CPU 31 via an SPI (Serial Peripheral Interface) bus can be used as the preset data memory 35.

The memory card I/F 36 is connected to the CPU 31. The memory card I/F 36 reads data from the memory card 28 mounted to the connector or writes data to the memory card 28 in accordance with an instruction from the CPU 31. In the present embodiment, data of images taken by the cameras 23 and 25 are written to the memory card 28, and the image data stored in the memory card 28 are read from the memory card 28 to be stored in the stored data memory 34.

The wireless communication module 37 functions to connect to a wireless LAN device by a method conformed to the standard of IEEE802.11.b/g. The local communication module 38 functions to wirelessly communicate with a game apparatus of the same type by a predetermined communication method. The wireless communication module 37 and the local communication module 38 are connected to the CPU 31. The CPU 31 is capable of receiving data from and sending data to another apparatus via the Internet by using the wireless communication module 37, and capable of receiving data from and sending data from another game apparatus of the same type by using the local communication module 38.

The RTC 39 and the power circuit 40 are connected to the CPU 31. The RTC 39 counts a time, and outputs the time to the CPU 31. The CPU 31 calculates a current time (date) based on the time counted by the RTC 39. The power circuit 40 controls electric power from a power supply (a battery) of the game apparatus 10 to supply the electric power to each electronic component of the game apparatus 10.

The game apparatus 10 includes the microphone 42 and an amplifier 43. The microphone 42 and the amplifier 43 are connected to the I/F circuit 41. The microphone 42 detects sound, and outputs a sound signal to the I/F circuit 41. The amplifier 43 amplifies the sound signal from the I/F circuit 41, and causes the speaker (not shown) to output the sound signal.

The I/F circuit 41 is connected to the CPU 31. The touch panel 13 is connected to the I/F circuit 41. The I/F circuit 41 includes a sound control circuit for controlling the microphone 42 and the amplifier 43 (the speaker) and a touch panel control circuit for controlling the touch panel 13. The sound control circuit performs A/D conversion or D/A conversion on the sound signal, and converts the sound signal into sound data in a predetermined format. The touch panel control circuit generates input position data in a predetermined format based on a signal from the touch panel 13, and outputs the input position data to the CPU 31. The input position data indicates coordinates of a position (an input position) of an input surface of the touch panel 13 at which an input is performed. The touch panel control circuit reads a signal from the touch panel 13 and generates input position data every a predetermined time period. The CPU 31 can recognize the input position with respect to the touch panel 13 by obtaining the input position data.

An operation section 14 includes the above buttons, and is connected to the CPU 31. The operation section 14 outputs operation data indicative of an input state with respect to each button (whether or not each button is pressed) to the CPU 31. The CPU 31 obtains the operation data from the operation section 14, and executes processing in accordance with an input with respect to the operation section 14.

The cameras 23 and 25 are connected to the CPU 31. Each of the cameras 23 and 25 takes an image in accordance with an instruction from the CPU 31, and outputs data of the taken image to the CPU 31. In the present embodiment, the CPU 31 gives an imaging instruction to the camera 23 or 25, and the camera which has received the imaging instruction takes an image and sends image data to the CPU 31.

The LCDs 12 and 22 are connected to the CPU 31. Each of the LCDs 12 and 22 displays an image thereon in accordance with an instruction from the CPU 31. In the present embodiment, the CPU 31 causes the lower LCD 12 to display a taken image obtained from the camera 23 or 25, and the upper LCD 22 to display an operation image for explaining an operation procedure, and the like.

[Outline of Image Conversion Processing]

Figure 3:
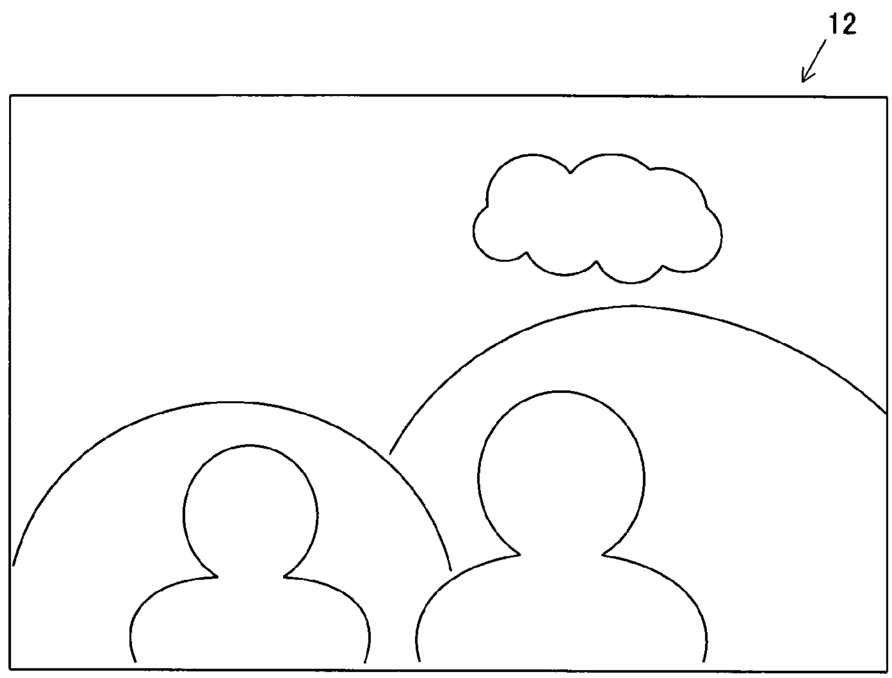
FIG. 3 is a view showing an example of an original image which is an object to be subjected to image conversion processing.
Figure 4:
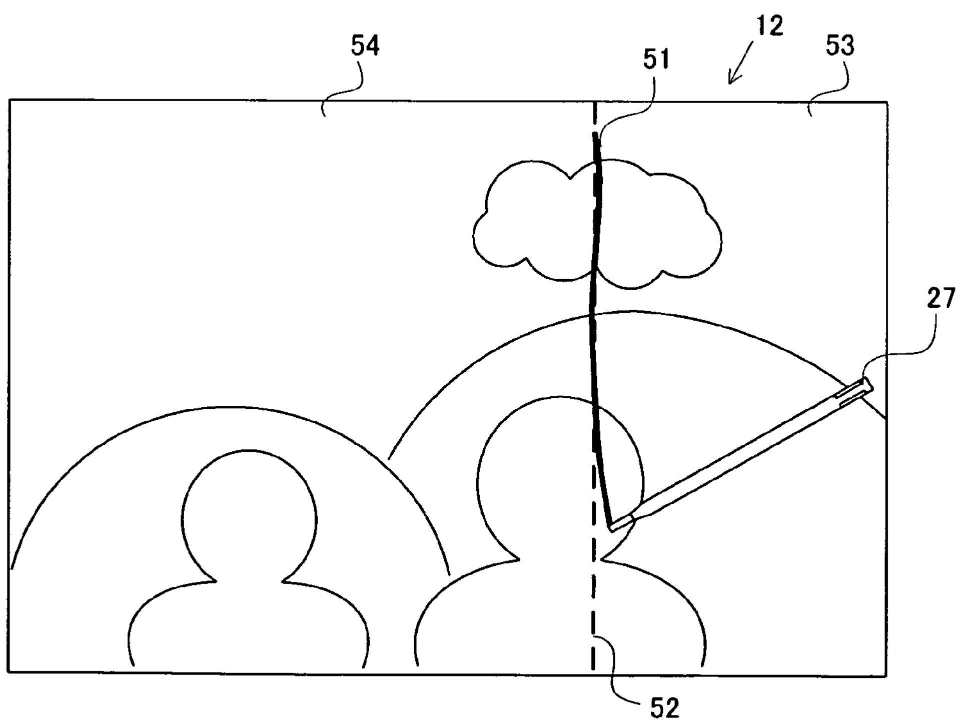
FIG. 4 is a view showing an operation for setting a dividing line with a touch panel 13.
Figure 5:
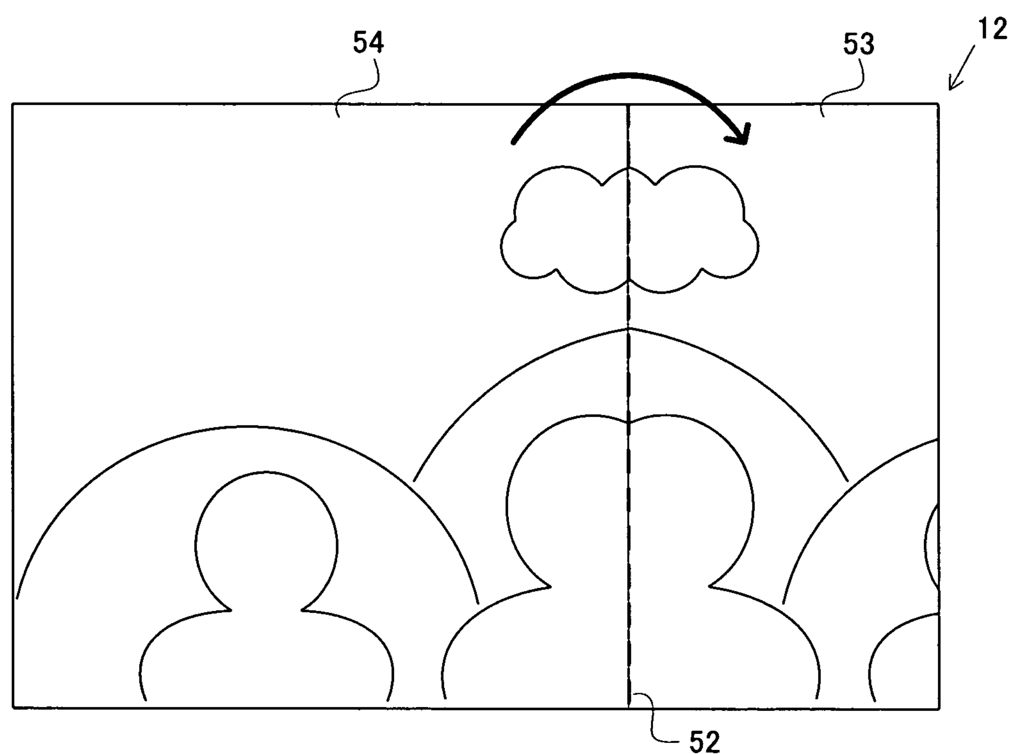
FIG. 5 is a view showing an example of a conversion image.

The following will describe an outline of the image conversion processing executed by the game apparatus 10 with reference to FIGS. 3 to 5. The present embodiment describes the case where the image conversion processing is executed with respect to an image taken by the camera 23 or 25.

First, the game apparatus 10 executes an original image display step. At the original image display step, processing of displaying an image before conversion (referred to as an original image) on a display device is executed. FIG. 3 is a view showing an example of an original image which is an object to be subjected to the image conversion processing. In the present embodiment, at the original image display step, for example, a taken image is displayed on the lower LCD 12 as shown in FIG. 3. In other words, when the user performs a photographing operation (a shutter operation), an image taken by the camera 23 or 25 at a time of the photographing operation is displayed on the lower LCD 12. It is noted that as described above, the original image is not limited to a taken image, but may be any image. In the present embodiment, since an input for setting a dividing line is performed with the touch panel 13, a taken image is displayed on the lower LCD 12. However, in the case where the input is not performed with the touch panel 13 (e.g. in the case where the input is performed with a button), a taken image may be displayed on the upper LCD 22.

Next, the game apparatus 10 executes a dividing line setting step. At the dividing line setting step, a dividing line is set by an instruction from the user. The dividing line is a line which divides an area of an image (an original image) displayed on the display device into two areas. Hereinafter, the two areas divided by the dividing line are referred to a first area and a second area, respectively. In the present embodiment, of the two areas divided by the dividing line, a smaller area is set as the first area, and a larger area is set as the second area. Further, in the present embodiment, the dividing line is set based on an input with respect to the touch panel 13. FIG. 4 is a view showing an operation for setting a dividing line with the touch panel 13. As shown in FIG. 4, the user inputs (draws) a line 51 on the touch panel 13 (on the screen of the lower LCD 12) with the touch pen 27, or the like. The game apparatus 10 sets a dividing line 52 based on the inputted line 51. Thus, an area of the original image is divided into a first area 53 and a second area 54. Although details will be described later, in the present embodiment, a plurality of candidate dividing lines (see FIG. 7) are set in advance on the screen of the lower LCD 12, and the dividing line 52 to be set is selected among the plurality of candidate dividing lines. In other words, among the candidate dividing lines, a line closest to the line 51 is set as the dividing line 52.

In the present embodiment, the touch panel 13 is used as an input device for setting a dividing line. However, the input device may be any device (another example of the input device will be described in a later-described modified example). Further, in the present embodiment, the dividing line is selected among the candidate dividing lines. However, in an alternative embodiment, candidate dividing lines may not be used, and a dividing line may be obtained based on an input by the user. For example, the game apparatus 10 may set a line inputted on the screen as a dividing line, or may calculate a straight line (or a curved line) approximating the inputted line as a dividing line (details will be described in the later-described modified example).

Subsequent to the dividing line setting step, the game apparatus 10 executes a change step. At the change step, the original image is converted by changing at least a part of an image of the first area 53 to an image generated from an image of the second area 54, and an image after the conversion (referred to as a conversion image) is displayed on the display device (the lower LCD 12). FIG. 5 is a view showing an example of the conversion image. In the present embodiment, the "image generated from the image of the second area" is an image obtained by inverting the image of the second area. In other words, the game apparatus 10 converts the image of the first area 53 into an image obtained by inverting the image of the second area 54 about the dividing line 52 (see FIG. 5). Thus, an image which is line symmetrical about the dividing line 52 (referred to as a symmetrical image) can be obtained as the conversion image. It is noted that although processing of inverting the image of the second area 54 may be any processing, in the present embodiment, a method using the original image as a texture with respect to an object composed of a plurality of polygons is used as the processing of inverting the image of the second area 54 (details will be described later). In an alternative embodiment, the "image generated from the image of the second area" may be the image of the second area itself (an image which has not been inverted), or an image obtained by executing predetermined processing (processing of expansion, reduction, change in shape, and the like) with respect to the image of the second area.

In the present embodiment, of the two areas divided by the dividing line, the larger area is set as the second area. In other words, an area of an image which is to be changed at the change step is set as the smaller area (the first area). In an alternative embodiment, of the two areas divided by the dividing line, the smaller area may be set as the second area, and the larger area may be set as the first area. In this case, at the change step, a part of the image of the first area is changed to an image generated from the image of the second area.

In the present embodiment, the conversion image is displayed in the lower LCD 12. However, in an alternative embodiment, the conversion image may be displayed on the upper LCD 22 and the lower LCD 12 or only on the upper LCD 22 instead of the lower LCD 12.

As described above, according to the image conversion processing, at the dividing line setting step, the user can set a dividing line located in a desired position and extending in a desired direction. Thus, the user can freely set a dividing line. As a result, various images can be obtained as conversion images. Further, in the present embodiment, the user can set a dividing line by inputting a line with the touch panel 13. Thus, the user can easily set a desired dividing line. Further, in the present embodiment, the image of the first area is converted into the image obtained by inverting the image of the second area about the dividing line (see FIG. 5). Thus, an image which is continuous at the dividing line can be obtained as a conversion image.

[Details of Processing Executed by Game Apparatus 10]

Figure 6:
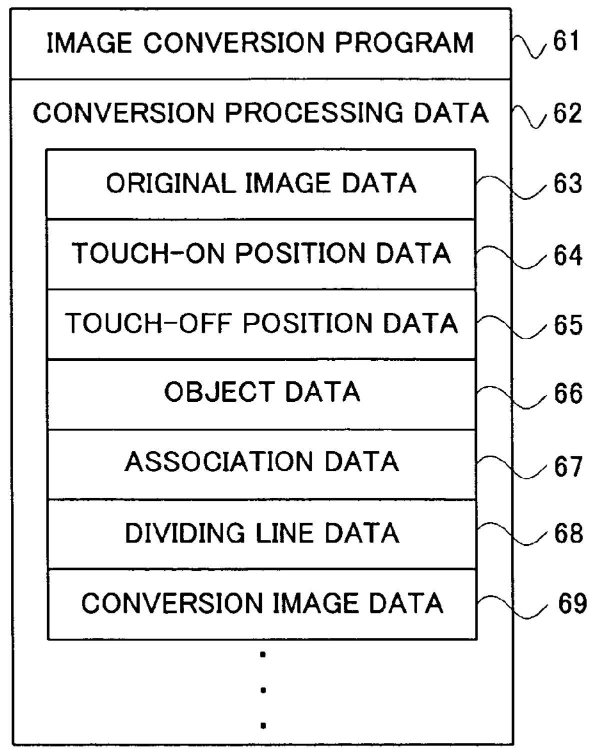
FIG. 6 is a view showing main data stored in a main memory 32 of the game apparatus 10.

The following will describe details of processing executed by the game apparatus 10, taking the above image conversion processing as a concrete example. First, with reference to FIGS. 6 to 9, main data used in the processing executed by the game apparatus 10 will be described. FIG. 6 is a view showing main data stored in the main memory 32 of the game apparatus 10. As shown in FIG. 6, in the main memory 32, an image conversion program 61 and conversion processing data 62 are stored. In the main memory 32, in addition to data shown in FIG. 6, data needed for the image conversion processing such as data indicative of an operation state with respect to each button (whether or not each button is pressed), image data used for the operation image for explaining the operation procedure and the like, and the like are stored.

The image conversion program 61 is a program for executing the above image conversion processing. The image conversion program 61 may be stored in advance in the main memory 32 or may be obtained from the memory card 28. In the case where the image conversion program 61 is obtained from the memory card 28, a part or an entirety of the image conversion program 61 is read from the memory card 28 at an appropriate timing after the power is applied to the game apparatus 10, and stored in the main memory 32.

The conversion processing data 62 is data used by the game apparatus 10 in the image conversion processing as needed. The conversion processing data 62 includes original image data 63, touch-on position data 64, touch-off position data 65, object data 66, association data 67, dividing line data 68, and conversion image data 69.

The original image data 63 is data indicative of an image (an original image) before conversion which is an object to be subjected to the image conversion processing. In the present embodiment, the original image is an image (a taken image) taken by the camera 23 or 25. In the present embodiment, while the power of the game apparatus 10 is ON, an image taken by the camera 23 or 25 is obtained by the CPU 31 at a predetermined time interval, and displayed on the lower LCD 12. When the user performs a predetermined photographing operation, a taken image obtained from the camera 23 or 25 at a time of the photographing operation is stored as the original image data 63 in the main memory 32.

The touch-on position data 64 is data indicative of a touch-on position on the screen. The touch-on position is a position at which an input is first performed when an input is continuously performed with respect to the touch panel 13. The touch panel 13 sends input position data to the CPU 31 at a predetermined time interval. The input position data is indicative of an input position when an input is performed with respect to the touch panel 13, and indicative of no input when an input is not performed with respect to the touch panel 13. The CPU 31 stores, among the input position data obtained from the touch panel 13, input position data which is first obtained when the input is continuously performed with respect to the touch panel 13 as the touch-on position data 64 in the main memory 32.

The touch-off position data 65 is data indicative of a touch-off position on the screen. The touch-off position is a position at which an input is last performed when the input is continuously performed with respect to the touch panel 13. The CPU 31 stores, among the input position data obtained from the touch panel 13, input position data which is last obtained when the input is continuously performed with respect to the touch panel 13 as the touch-off position data 65 in the main memory 32.

The object data 66 is data for composing an object which is to be located in a virtual three-dimensional space, namely, data indicative of positions (positions in the three-dimensional space) of tops of a plurality of polygons composing the object. In the present embodiment, the CPU 31 executes three-dimensional image processing for displaying a taken image (an original image) and a conversion image. In other words, the CPU 31 executes processing of locating the object in the virtual three-dimensional space and generating an image obtained by viewing the object to which the original image is attached as a texture from a virtual camera. The object composed of the plurality of polygons preferably has a plane which is the same in size as or larger than an area to be displayed on the screen. In other words, it is preferable that an entirety or a part of the object be displayed across the entire screen. In the present embodiment, the object has a sheet shape which is the same as that of the image to be displayed.

Figure 7:
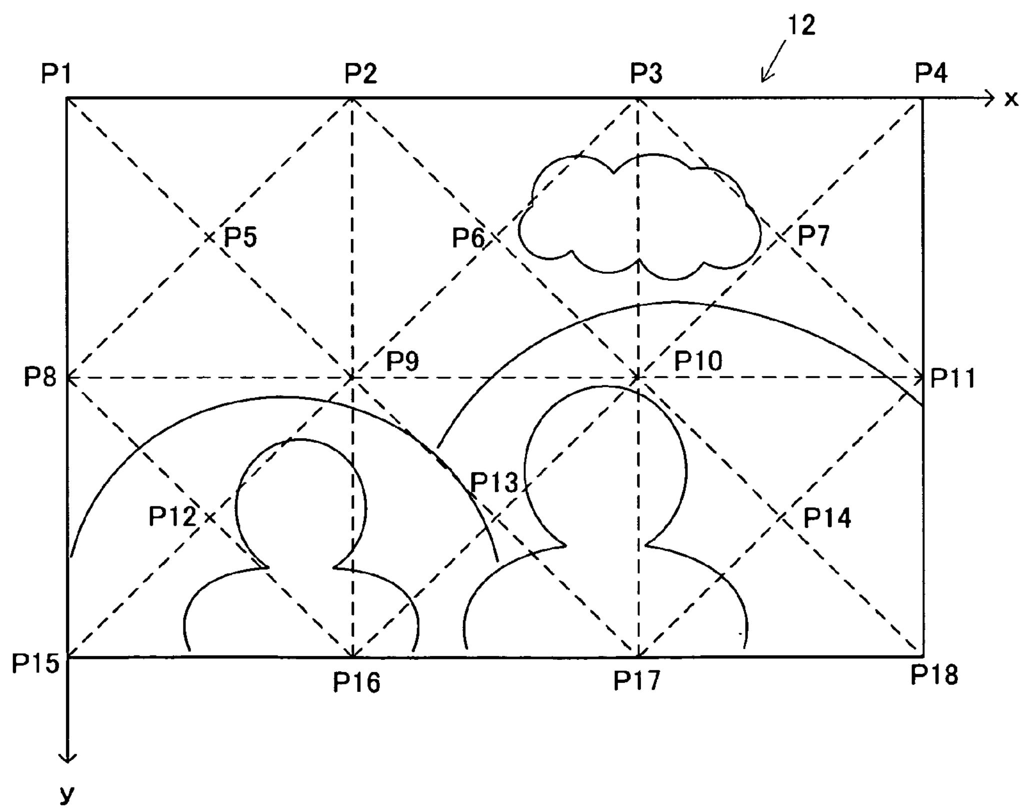
FIG. 7 is a view showing an example of candidate dividing lines.

In the present embodiment, each of the polygons composing the object is set such that sides of the polygons correspond to candidate dividing lines. Prior to description of a method of setting the polygons, a method of setting the candidate dividing lines will be described. FIG. 7 is a view showing an example of the candidate dividing lines. When the candidate dividing lines are set, first, a plurality of points are arranged on the screen (on the image) in a lattice-like pattern (at positions of intersections in a lattice) (hereinafter, the points arranged in a lattice-like pattern are referred to as lattice points). In the example as shown in FIG. 7, in an x-y coordinate system, twelve lattice points P1 to P4, P8 to P11, and P15 to P18 are arranged. In FIG. 7, a plurality of lattice points are arranged in a lattice-like pattern along vertical and lateral directions of the screen. However, a plurality of lattice points may be arranged in a lattice-like pattern which is inclined obliquely with respect to the vertical and lateral directions of the screen.

Next, lines extending through the lattice points are set as candidate dividing lines. More specifically, "lines extending through the lattice points and extending in a vertical or lateral direction of a lattice formed by the lattice points (candidate dividing lines extending in vertical and lateral directions)" and "lines extending through the lattice points and extending obliquely at an angle of 45 degrees with respect to the lattice formed by the lattice points (candidate dividing lines extending in oblique directions)" are set as candidate dividing lines. Thus, in FIG. 7, eleven candidate dividing lines are set as indicated by dotted lines. Points P5 to P7 and P12 to P14 are intersections among the candidate dividing lines extending in the oblique directions. Hereinafter, the lattice points P1 to P4, P8 to P11, and P15 to P18 and the intersections P5 to P7 and P12 to P14 among the candidate dividing lines extending in the oblique directions are generically referred to as reference points. In the present embodiment, all lines each of which satisfies a condition for a candidate dividing line extending in the vertical or lateral directions or a condition for a candidate dividing line extending in the oblique direction are set as candidate dividing lines. However, in an alternative embodiment, only some of the lines which satisfy any of the conditions may be set as candidate dividing lines. For example, in an alternative embodiment, only candidate dividing lines extending in the vertical and lateral directions may be set as candidate dividing lines.

It is noted that it is preferable that each candidate dividing line be set such that continuity of a conversion image is maintained. More specifically, like the eleven candidate dividing lines shown in FIG. 7, it is preferable that each candidate dividing line be set such that when at least one of the two areas divided by the candidate dividing line is inverted about the candidate dividing line, the inverted image covers an entirety of the other area. By setting so, the continuity of the conversion image can be maintained by changing the image of the smaller area to an image obtained by inverting the image of the larger area.

Figures 8, 9:
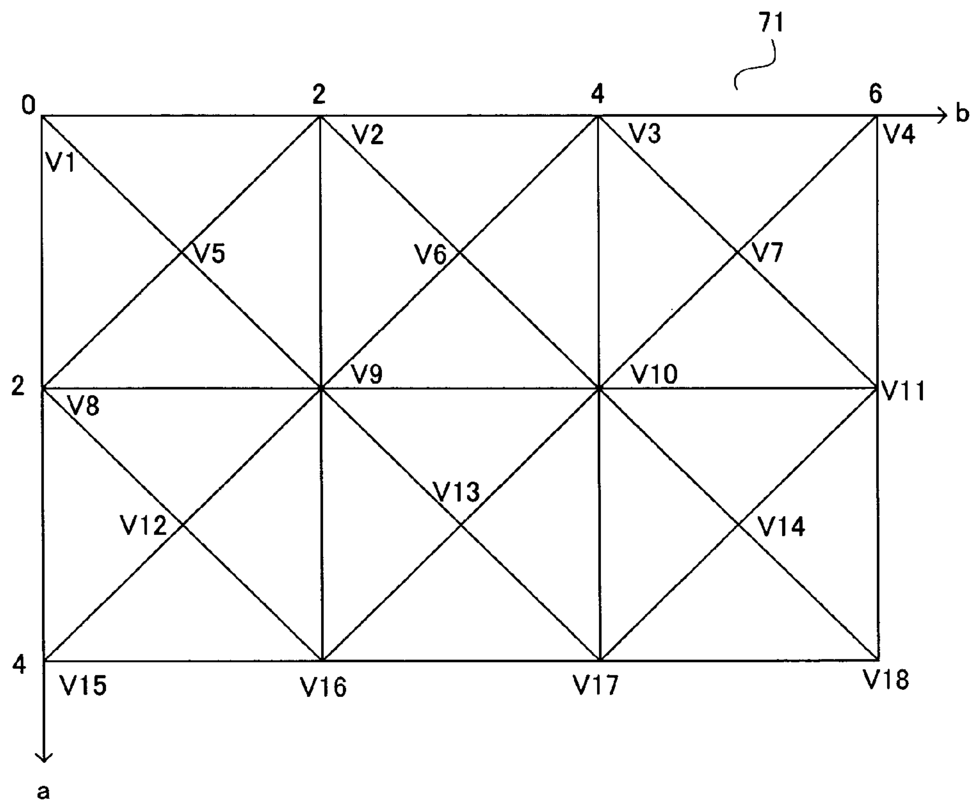
FIG. 8 is a view showing an object composed of polygons corresponding to the candidate dividing line.
FIG. 9 is a view showing an example of a two-dimensional array indicated by association data 67.

With respect to the candidate dividing lines as set above, each of the polygons composing the object is located such that when the object is displayed on the screen, the sides of the polygons correspond to (coincide with) the candidate dividing lines. FIG. 8 is a view showing the object composed of the polygons corresponding to the candidate dividing lines shown in FIG. 7. As shown in FIG. 8, an object 71 has a planar shape which is substantially the same as shapes of the LCDs 12 and 22. When an image (an original image or a conversion image) is displayed, the object 71 is displayed such that sides of the object 71 substantially coincide with a frame of a display area of the screen. Each of the polygons composing the object 71 is located such that (when the object is displayed on the screen) the reference points P1 to P18 corresponds to tops V1 to V18 of the polygons and the candidate dividing lines correspond to the sides of the polygons (see FIG. 8). As a result, as shown in FIG. 8, the object 71 is composed of twenty-four polygons. The polygons are located such that the polygons do not overlap with each other and any gap is not formed therebetween. Although details will be described later, the image conversion processing can be easily executed by making the polygons correspond to the candidate dividing lines as described above.

In the present embodiment, for easily indicating positional relations among the tops of the polygons, in addition to a position in the three-dimensional space, a position of each top of the polygons can be also indicated as a position represented by a square of a lattice (a two-dimensional position on the planar object 71). More specifically, as shown in FIG. 8, a position of each top of the polygons on the object 71 can be represented by coordinate values in an a-b coordinate system. In FIG. 8, an a-axis represents a position in a vertical direction of the polygon, and a b-axis represents a position in a lateral direction of the polygon. As described above, in the present embodiment, the object data 66 is data indicative of a position in the three-dimensional space as well as a two-dimensional position on the object 71 for each top of the polygons. In other words, the object data 66 is indicative of an association of the position in the three-dimensional space (three-dimensional coordinates) with the two-dimensional position on the object 71 (a-b coordinates) for each top of the polygons. It is noted that the object data 66 is prepared in advance together with the image conversion program 61, and stored in the main memory 32 at a time of start of the processing executed by the game apparatus 10.

The association data 67 shown in FIG. 6 is data indicative of associations of (the positions of) the tops of the plurality of polygons composing the object with positions (x-y coordinates) on the image which correspond to the tops. As described above, in the present embodiment, for displaying an original image and a conversion image, processing of attaching the original image as a texture to the object is executed. The association data 67 is data used for executing the processing.

In the present embodiment, the association data 67 has a data structure of a two-dimensional array. FIG. 9 is a view showing an example of the two-dimensional array indicated by the association data 67. FIG. 9 shows a correspondence between subscripts and an element of a two-dimensional array V[a] [b]. In FIG. 9, the subscripts (a, b) of the two-dimensional array V[a] [b] represent a position (a-b coordinates) of a top of a polygon, and the element of the two-dimensional array V[a] [b] represents a position on the image corresponds to the top. In other words, the element of the two-dimensional array V[a] [b] represents a position (on the image) associated with the position of the top represented by the subscripts (a, b). More specifically, the element of the two-dimensional array V[a] [b] is any of the positions of the reference points (the points P1 to P18 shown in FIG. 7) for the above candidate dividing lines. For example, "V[2] [2]=(x9, y9) indicates that a position on the image, P9=(x9, y9), is associated with the top V9 of the polygon which is represented by (a, b)=(2, 2). It is noted that positions represented by subscripts of the two-dimensional array include positions which do not correspond to any of the tops of the polygons, for example, V[0] [1]. Concerning such subscripts representing positions which do not correspond to any of the tops of the polygons, their elements do not represent positions on the image (they are represented as "NULL" in FIG. 9). Although details will be described later, by using the above two-dimensional array, the associations of the tops of the polygons with the positions on the image can be easily changed.

It is noted that the associations of the tops of the polygons with the positions on the image as shown in FIG. 9 are associations when the original image shown in FIG. 7 is displayed without change. At the time of start of the processing executed by the game apparatus 10, as associations in an initial state, the association data 67 indicative of the associations when the original image is displayed without change is stored in the main memory 32.

Referring back to FIG. 6, the dividing line data 68 is data indicative of a dividing line. In the present embodiment, the dividing line is selected among the candidate dividing lines, and each candidate dividing line extends through two or more of the reference points, so that the dividing line can be represented by two reference points. Therefore, in the present embodiment, the dividing line data 68 is data indicative of positions of two reference points.

The conversion image data 69 is data indicative of an image after conversion by the image conversion processing (a conversion image). In the image conversion processing, content of the association data 67 are changed, thereby changing the associations of the tops of the polygons with the positions on the image. The conversion image data 69 is generated in accordance with content of the association data 67 after the change.

Figure 10:
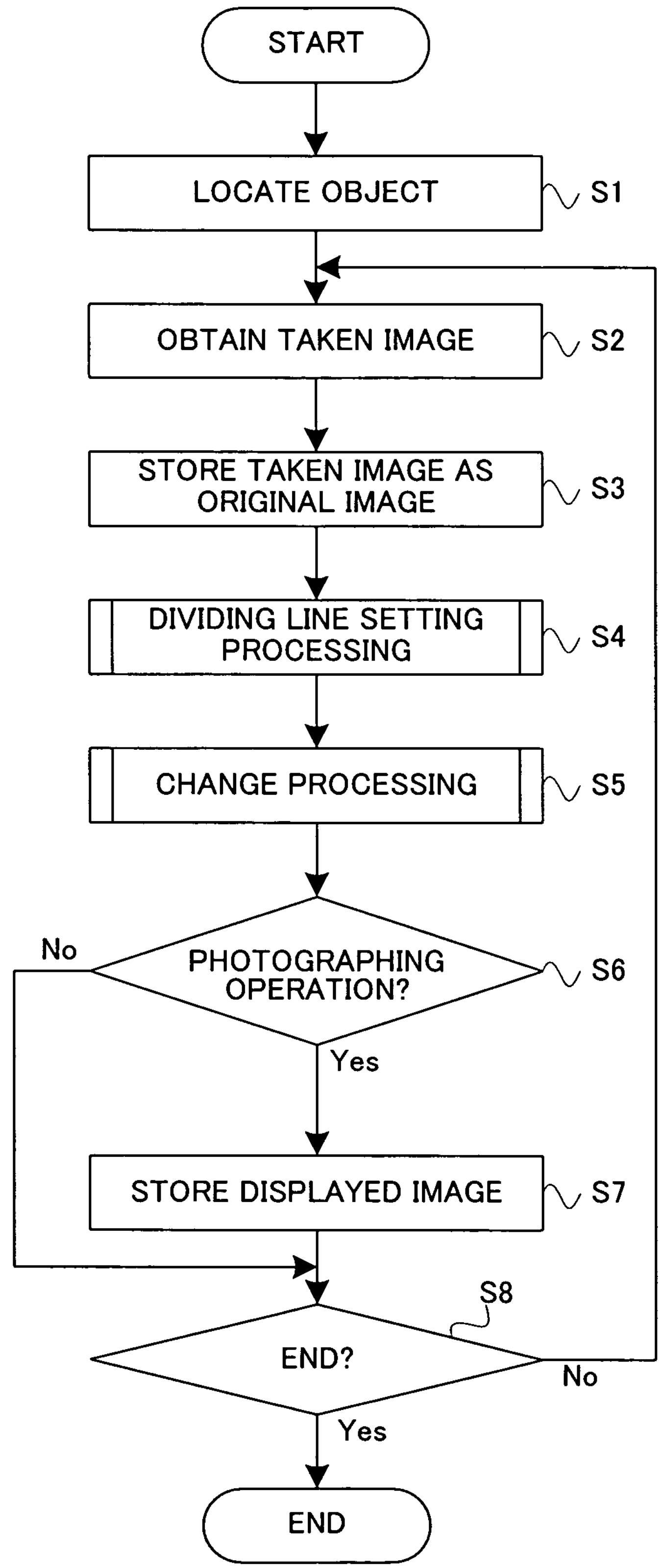
FIG. 10 is a flow chart showing a procedure of image conversion processing executed by the game apparatus 10.

The following will describe an operation of the game apparatus 10 with reference to FIGS. 10 to 15. FIG. 10 is a flow chart showing a procedure of the image conversion processing executed by the game apparatus 10. When the power is applied to the game apparatus 10 by pressing the power button, the CPU 31 of the game apparatus 10 initializes the main memory 32 and the like, and then starts executing a program for executing the image conversion processing shown in FIG. 10.

At a step S1 shown in FIG. 10, the CPU 31 locates an object to be used for displaying an original image in the three-dimensional space. In other words, the CPU 31 locates a plurality of polygons in the three-dimensional space in accordance with the object data 66 stored in the main memory 32. Subsequent to the step S1, processing at a step S2 is executed. After that, a processing loop of the steps S2 to S8 is executed every a predetermined time period (every a one-frame time period, e.g. every 1/60 sec.), and repeated until the image conversion processing is terminated.

At the step S2, the CPU 31 obtains data of an image taken by the inner camera 23 or the outer camera 25. In the present embodiment, any one of the cameras 23 and 25 takes an image, and the CPU 31 obtains data of the image from the one camera. It is noted that which one of the cameras 23 and 25 takes an image is determined in accordance with an instruction from the user. As described above, the processing at the step S2 is repeatedly executed every the predetermined time period (e.g. every 1/60 sec.). By repeatedly executing the processing at the step S2, a real-time image taken by the camera 23 or 25 is displayed on the lower LCD 12. In an alternative embodiment, the real-time image may be displayed on the upper LCD 22, and an image taken at a time of a photographing operation may be displayed on the lower LCD 12. Subsequent to the step S2, processing at a step S3 is executed.

At the step S3, the CPU 31 stores the taken image as an original image. In other words, data of the taken image obtained at the step S2 which is last executed is stored as the original image data 63 in the main memory 32. Thus, in the present embodiment, the original image data 63 is updated for each frame (every time the processing loop of the steps S2 to S8 is executed). Subsequent to the step S3, processing at a step S4 is executed.

At the step S4, the CPU 31 executes dividing line setting processing (the above dividing line setting step). The dividing line setting processing is processing for setting a dividing line in accordance with an instruction from the user. The following will describe the dividing line setting processing with reference to FIG. 11.

FIG. 11 is a flowchart showing a procedure of the dividing line setting processing (the step S4) shown in FIG. 10. In the dividing line setting processing, at a step S11, the CPU 31 obtains input position data from the touch panel 13. The obtained input position data is stored in the main memory 32. It is noted that in the present embodiment, the CPU 31 stores input position data (current input position data) obtained at the step S11 in the current dividing line setting processing and input position data (last input position data) obtained at the step S11 in the last dividing line setting processing at least in the main memory 32. Subsequent to the step S11, processing at a step S12 is executed.

At the step S12, the CPU 31 determines whether or not an input has been performed with respect to the touch panel 13. The determination at the step S12 can be made based on the input position data obtained at the step S11. In other words, when the input position data indicates an input position, a result of the determination at the step S12 is positive, and processing at a step S13 is executed. On the other hand, when the input position data indicates that an input has not been performed, the result of the determination at the step S12 is negative, and later-described processing at a step S19 is executed.

At the step S13, the CPU 31 determines whether or not the input detected at the step S11 in the current dividing line setting processing is a first input. More specifically, the CPU 31 determines whether or not an input position indicated by the current input position data is a touch-on position. The determination at the step S13 can be made based on content of the last input position data. In other words, when the last input position data indicates an input position, a result of the determination at the step S13 is negative, and later-described processing at a step S16 is executed. On the other hand, when the last input position data indicates that an input has not been performed, the result of the determination at the step S13 is positive, and processing at a step S14 is executed. It is noted that when the result of the determination at the step S13 is positive, the CPU 31 stores the current input position data as the touch-on position data 64 in the main memory 32.

At the step S14, the CPU 31 identifies a first reference point to be a part of a dividing line based on the touch-on position. More specifically, the CPU 31 identifies a lattice point closest to the touch-on position among the lattice points included in the reference points for the candidate dividing lines (the points P1 to P4, P8 to P11, and P15 to P18 as shown in FIG. 7). The touch-on position can be known by referring to the touch-on position data 64 stored in the main memory 32. Data indicative of a position (coordinates in an x-y coordinate system) of the identified lattice point is stored as the dividing line data 68 in the main memory 32.

Figure 12:
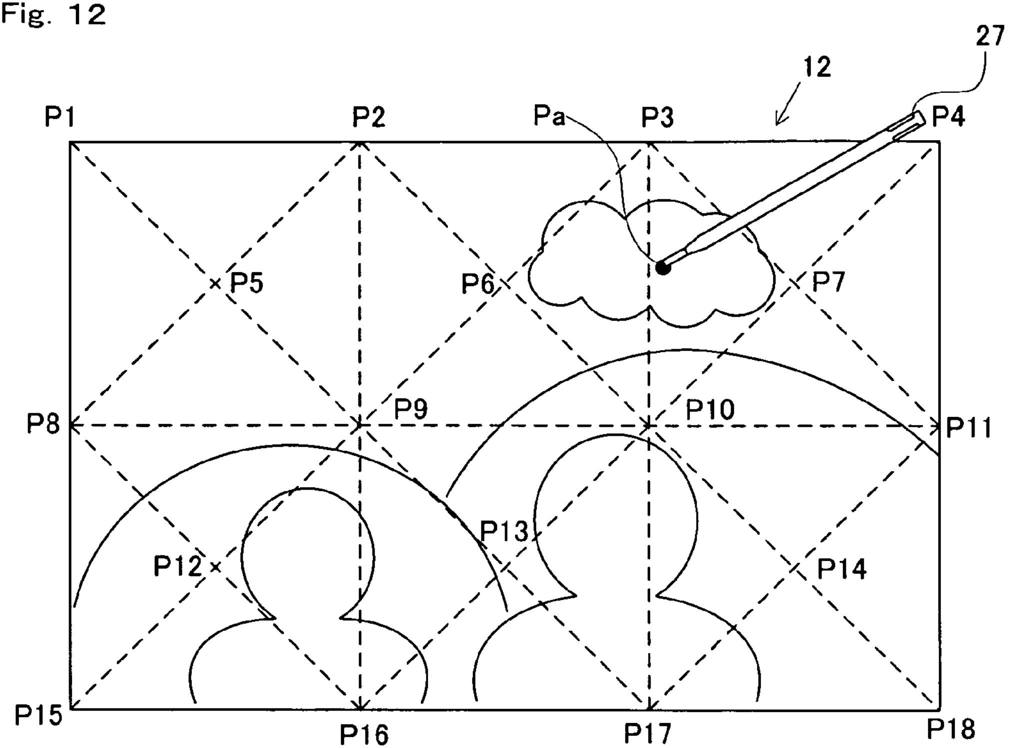
FIG. 12 is a view for explaining processing at a step S14.

FIG. 12 is a view for explaining the processing at the step S14. In FIG. 12, a position of a point Pa on the screen is a touch-on position. At this time, a lattice point closest to the point Pa is a point P3. Thus, the CPU 31 stores data indicative of a position of the point P3 as the dividing line data 68 in the main memory 32. Subsequent to the processing at the step S14, processing at a step S15 is executed.

At the step S15, the CPU 31 draws a candidate dividing line extending through the reference point identified at the step S14 and extending in a predetermined direction in a memory (a frame buffer) which stores image data to be displayed on the LCDs 12 and 22. The predetermined direction may be set in advance, for example, to be a vertical direction with respect to the screen or to be a direction of a dividing line which is last set. By the drawing processing at the step S15, the candidate dividing line is displayed so as to be superimposed on the take image at a later-described step S33. After the step S15, the CPU 31 terminates the dividing line setting processing.

Meanwhile, at the step S16, the CPU 31 calculates a direction from the touch-on position to a latest input position. More specifically, the CPU 31 calculates a vector having an initial point at the touch-on position and an end point at the latest input position. The touch-on position can be known by referring to the touch-on position data 64 stored in the main memory 32. The latest input position can be known by referring to data stored as the touch-off position data 65 in the main memory 32 at the moment. Subsequent to the step S16, processing at a step S17 is executed.

At the step S17, the CPU 31 selects a candidate dividing line having a direction closest to the direction calculated at the step S16 among candidate dividing lines extending through the lattice point closest to the touch-on position. The following will describe the processing at the steps S16 and S17 with reference to FIG. 13.

Figure 13:
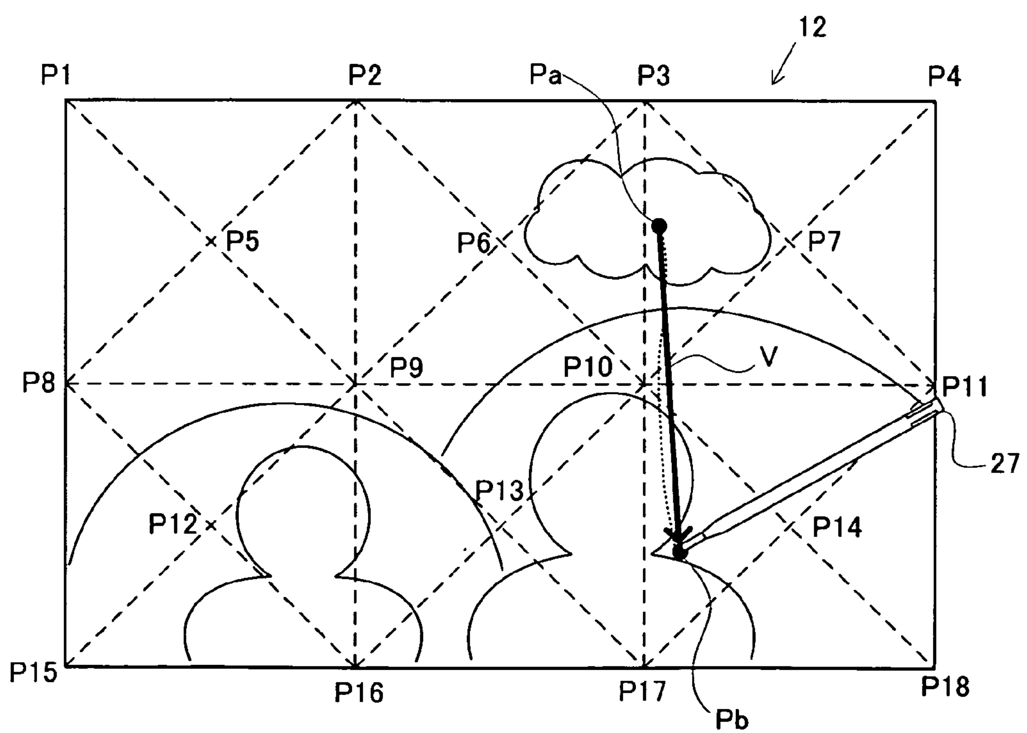
FIG. 13 is a view for explaining processing at a step S17.

FIG. 13 is a view for explaining the processing at the step S17. FIG. 13 shows a state where an input is continuously performed with respect to the touch panel 13 in a state shown in FIG. 12 and a current input position is a point Pb. In the case shown in FIG. 13, a vector V is calculated at the step S16. At the step S17, a candidate dividing line extending through the lattice point P3 and having a direction closest to a direction of the vector V is selected. In FIG. 13, candidate dividing lines extending through the lattice point P3 include a straight line extending from the point P3 to the point P15, a straight line extending form the point P3 to the point P17, and a straight line extending from the point P3 to the point P11. Among these straight lines, a candidate dividing line having a direction closest to the direction of the vector V is the straight line extending from the point P3 to the point P17. Thus, at the step S17, the candidate dividing line extending from the point P3 to the point P17 is selected.

Subsequent to the step S17, processing at a step S18 is executed. At the step S18, the CPU 31 draws the candidate dividing line selected at the step S17 in the frame buffer similarly at the step S15. After the processing at the step S18, the CPU 31 terminates the dividing line setting processing.

In the processing at the steps S16 to S18, the candidate dividing line is selected in a manner which is the same as a manner of selecting a dividing line (later-described steps S19 and S20). As a result, at the later-described step S33, the selected candidate dividing line is displayed together with the original image or the conversion image. Thus, in the present embodiment, in the middle of an input with respect to the touch panel 13, the candidate dividing line which becomes a dividing line when it is assumed that the input is finished at the time is displayed. Thus, the user can set a desired dividing line as intended, and an operation for setting a dividing line is facilitated.

Meanwhile, at the step S19, the CPU 31 determines whether or not it is immediately after an end of the input with respect to the touch panel 13. The determination at the step S19 can be made based on the content of the last input position data. More specifically, when the last input position data indicates an input position, a result of the determination at the step S19 is positive, and processing at steps S20 and S21 are executed. On the other hand, when the last input position data indicates that an input has not been performed, the result of the determination at the step S19 is negative, the processing at the steps S20 and 21 are skipped, and the CPU 31 terminates the dividing line setting processing.

In the processing at the steps S20 and S21, processing of setting a dividing line in accordance with an instruction from the user is executed. Specifically, at the step S20, the CPU 31 calculates a direction from the touch-on position to the touch-off position. More specifically, the CPU 31 calculates a vector having an initial point at the touch-on position and an end point at the touch-off position. The touch-on position and the touch-off position can be known by referring to the touch-on position data 64 and the touch-off position data 65 which are stored in the main memory 32. In other words, the processing at the step S20 is the same as the processing at the step S16. Subsequent to the step S20, the processing at the step S21 is executed.

At the step S21, the CPU 31 selects a dividing line among candidate dividing lines. More specifically, similarly at the step S17, a candidate dividing line having a direction closest to the direction calculated at the step S20 is selected as the dividing line among candidate dividing lines extending through the lattice point closest to the touch-on position. Further, at the step S21, data indicative of a second reference point of the dividing line is added to the dividing line data 68. In other words, the dividing line data 68 is updated to include data indicative of the position of the lattice point identified at the step S13 and the data indicative of the position of the second reference point. Thus, the dividing line is identified by the dividing line data 68. After the step S21, the CPU 31 terminates the dividing line setting processing.

According to the dividing line setting processing described above, the CPU 31 selects the dividing line among the candidate dividing lines not by using all input positions continuously inputted to the touch panel 13 but by using only two input positions, namely, the touch-on position and the touch-off position. Thus, the dividing line can be selected with simple processing as compared to a manner of selecting a dividing line by using all of the input positions (e.g. a manner of calculating an approximate straight line by using all of the input positions, and the like). In an alternative embodiment, the CPU 31 may select a dividing line by using all of the input positions continuously inputted to the touch panel 13. For example, the CPU 31 may calculate an approximate straight line from the continuously inputted positions, and may select a candidate dividing line closest to the approximate straight line as a dividing line.

In the present embodiment, the CPU 31 calculates a position (the touch-on position) and a direction (the direction from the touch-on position to the touch-off position) on the screen from a plurality of input positions (more specifically, the touch-on position and the touch-off position) continuously inputted to the touch panel 13 (the steps S14 and S20). Then, based on the calculated position and direction, a dividing line is selected among the candidate dividing lines (the step S21). By thus calculating a position and a direction of a line drawn by the user and selecting a candidate dividing line having a position and a direction which are closest to the calculated position and direction as a dividing line, a dividing line according to user's intention can be precisely selected. Further, specifically, the CPU 31 selects a candidate dividing line having a direction closest to the direction from the touch-on position to the touch-off position as a dividing line among the candidate dividing lines extending through the lattice point closest to the touch-on position. Thus, a dividing line according to the user's intention can be precisely selected by using only two input positions. In an alternative embodiment, for example, the CPU 31 may select a candidate dividing line extending through the reference point closest to the touch-on position and a reference point closest to the touch-off position as a dividing line.

Referring back to FIG. 10, subsequent to the dividing line setting processing at the step S4, processing at a step S5 is executed. In other words, at the step S5, the CPU 31 executes change processing (the above change step). The change processing is processing for converting the original image by changing the image of the first area divided by the set dividing line to the image obtained by inverting the image of the second area, and displaying the conversion image. The following will describe the change processing with reference to FIG. 14.

Figure 14:
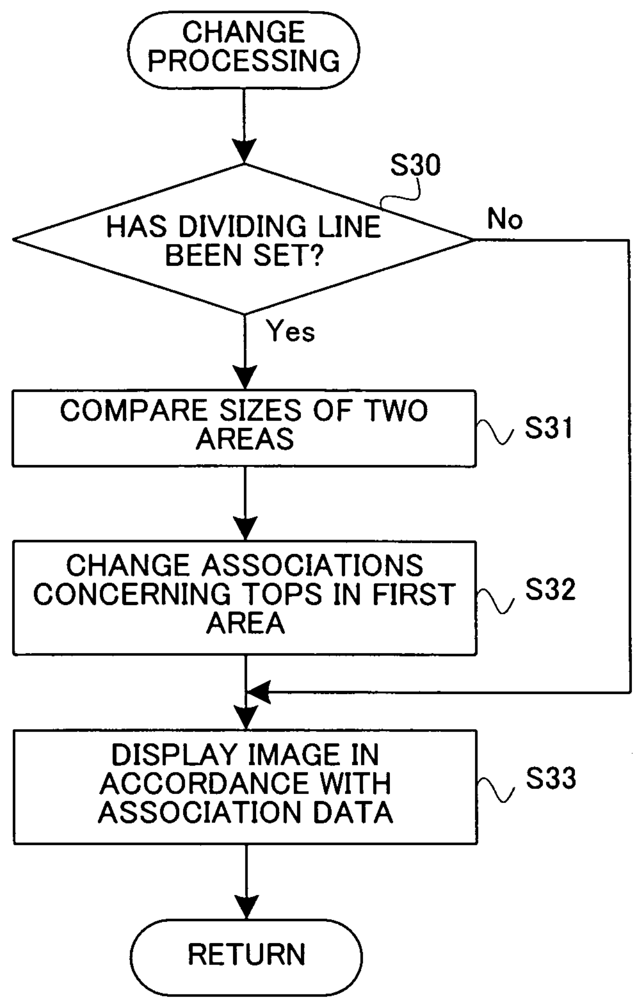
FIG. 14 is a flow chart showing a procedure of change processing (a step S5) shown in FIG. 10.

FIG. 14 is a flow chart showing a procedure of the change processing (the step S5) shown in FIG. 10. In the change processing, at a step S30, the CPU 31 determines whether or not a dividing line has been set at the step S4. In other words, the CPU 31 determines whether or not the step S21 has been executed at the step S4 in the current processing loop. When a result of the determination at the step S30 is positive, processing at steps S31 and 32 are executed. On the other hand, when the result of the determination at the step S30 is negative, the processing at the steps S31 and S32 are skipped, and processing at the step S33 is executed.

At the step S31, the CPU 31 compares sizes (specifically, areas) of two areas divided by the dividing line set at the step S4. As described above, in the present embodiment, as a result of the comparison, a smaller area is set as a first area, and a larger area is set as a second area. Subsequent to the step S31, processing at the step S32 is executed.

At the step S32, the CPU 31 changes the content of the association data 67. More specifically, concerning tops of polygons included in the first area when the object is displayed on the screen, the associations indicated by the association data 67 are changed. In the present embodiment, the CPU 31 changes positions on the screen which are associated with the tops of the polygons included in the first area to positions which are associated with tops symmetrical to the tops about the dividing line. Thus, an image of the first area can be changed to an image obtained by inverting an image of the second area. The following will describe a concrete example of the step S32 with reference to FIG. 15.

FIG. 15 is a view showing an example of the association data 67 after the change. More specifically, FIG. 5 is a view showing changed content of the association data 67 shown in FIG. 9 when a dividing line extending through the reference points P3 and P17 is set. As shown in FIG. 15, when the dividing line extending through the reference points P3 and P17 is set, the first area is an area on a right side of the dividing line. Thus, concerning the tops V4, V7, V11, V14, and V18 included in the area on the right side of the dividing line, the associations are changed (see slant lines shown in FIG. 15). More specifically, a position on the image which is associated with each of the tops is changed to a position on the image which is associated with a top symmetrical to each of the tops about the dividing line. For example, concerning the top V4, a position on the image which is associated with the top V4 is changed to a position P2=(x2, y2) on the image which is associated with the top V2 symmetrical to the top V4 about the dividing line. More specifically, the CPU 31 changes an element of V[0] [6] of the two-dimensional array to (x2, y2). Concerning the other tops V7, V11, V14, and V18, similarly as the top V4, associated positions on the image are changed. In the present embodiment, a position of a top in the object is represented by using a-b coordinates. Thus, as compared with a case of using a position in a three-dimensional space, a top symmetrical to a top about a dividing line can be easily identified.

By the processing at the step S32 as described above, the associations of the tops of the polygons composing the object with the positions on the original image are changed. Subsequent to the step S32, processing at the step S33 is executed.

At the step S33, the CPU 31 displays an image on the lower LCD 12 in accordance with the association data 67 (the above original image display step). In other words, the CPU 31 associates each top of each of the polygons composing the object with a position on the original image in accordance with the object data 66 and the association data 67 which are stored in the main memory 32. Then, the CPU 31 displays an image by drawing the object using the original image as a texture in accordance with obtained associations. When a dividing line has not been set in the above dividing line setting processing (the step S4), the association data 67 indicates the above associations in the initial state, and thus the original image is displayed without change (see FIG. 3). On the other hand, when a dividing line has been set in the dividing line setting processing, the content of the association data 67 has been updated (the step S32), and thus a conversion image in which apart of the original image is inverted is displayed (see FIG. 5). When a candidate dividing line has been drawn at the step S15 or S18 in the above dividing line setting processing, the original image or the conversion image is displayed with the candidate dividing line superimposed thereon. After the step S33, the CPU 31 terminates the change processing.

Figure 16:
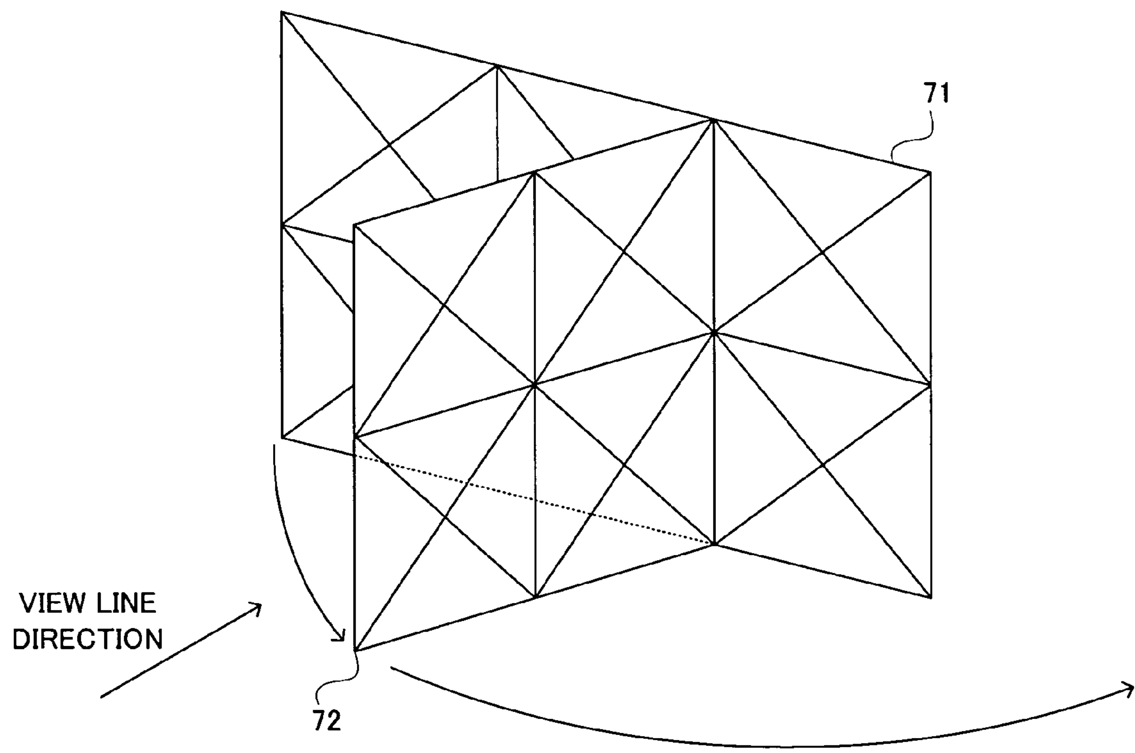
FIG. 16 is a view for explaining a modified example of a step S33.

In an alternative embodiment, at the step S33, the CPU 31 may display a state in which the image of the second area is inverted and displayed in the first area by using an animation. FIG. 16 is a view for explaining a modified example of the step S33. More specifically, at the step S33, the CPU 31 newly locates an object 72, which is a part of the object 71 corresponding to the second area divided by the dividing line, in the three-dimensional space, and rotates the object 72 about the dividing line (see arrows shown in FIG. 16). Each top of polygons of the object 72 is associated with a position on the original image in the same manner as the association of each top of the polygons of the object 71. Thus, an animation in which the image of the second area is inverted and displayed in the first area can be created, and displayed. In the present embodiment, since the three-dimensional image processing using polygons is executed, such an animation can be easily created by moving the polygons or the virtual camera in the virtual three-dimensional space.

Referring back to FIG. 10, subsequent to the change processing at the step S5, processing at a step S6 is executed. At the step S6, the CPU 31 determines whether or not a photographing operation has been performed. The photographing operation is an operation in which the game apparatus 10 performs an instruction to store an original image or a conversion image in storage means capable of storing data. Here, the photographing operation is an operation of pressing a predetermined button provided in the game apparatus 10. In other words, the CPU 31 obtains operation data indicative of an input state with respect to each button (whether or not each button is pressed) from the operation section 14, and determines whether or not the predetermined button has been pressed by referring to the obtained operation data. When the predetermined button has been pressed, the CPU 31 determines that the photographing operation has been performed, and processing at a step S7 is executed. On the other hand, when the predetermined button has not been pressed, the CPU 31 determines that the photographing operation has not been performed, the processing at the step S7 is skipped, and processing at a step S8 is executed. In an alternative embodiment, the photographing operation may be performed with the touch panel 13. More specifically, the game apparatus 10 may display a photographing button on a part of the lower LCD 12, and a touch operation with respect to the photographing button may be the photographing operation.

At the step S7, the CPU 31 stores a currently displayed image. In other words, the image displayed at the step S33 is stored, for example, in the stored data memory 34. Thus, the user can store the taken original image and the conversion image obtained by executing predetermined conversion on the original image. Subsequent to the step S7, the processing at the step S8 is executed.

At the step S8, the CPU 31 determines whether or not to terminate the image conversion processing. The determination at the step S8 is made as to whether or not the user performs an operation for an instruction to terminate the image conversion processing. When a result of the determination at the step S8 is negative, the processing at the step S2 is executed again. Thus, in the present embodiment, the dividing line setting processing (the step S4) and the change processing (the step S5) can be repeatedly executed. Thus, a dividing line can be reset with respect to the conversion image obtained by converting the original image, thereby generating an image obtained by converting the conversion image. As a result, more various images can be generated. On the other hand, when the result of the determination at the step S8 is positive, the CPU 31 terminates the image conversion processing.

In the present embodiment, an image taken by the camera 23 or 25 is obtained repeatedly, and display processing (the step S33) is executed with the repeatedly obtained image used as the original image. In other words, an image used as the original image is changed for each frame. Thus, the game apparatus 10 is capable of executing the predetermined image conversion processing with respect to an image (a moving image) which is changed in real time. In an alternative embodiment, the game apparatus 10 may execute the predetermined image conversion processing with respect to a taken image stored by the photographing operation by the user. In other words, the image conversion processing may be executed with the image stored at the step S7 as the original image.

As described above, according to the present embodiment, by setting a dividing line in accordance with an instruction from the user, the user can freely set a line for dividing an image, and obtain various images as conversion images. Further, the game apparatus 10 repeatedly obtains an input position which is inputted with respect to the touch panel 13 on the screen on which the original image is displayed (the step S11), and selects (sets) a dividing line based on a plurality of continuously obtained input positions (the step S21). Thus, the user can set a dividing line as if the user directly inputted a dividing line with respect to the original image, and an operation manner capable of performing an intuitive operation and having an excellent operational feeling can be provided.

In the present embodiment, when the object 71 composed of the plurality of polygons is displayed on the screen, the object 71 is located in the virtual three-dimensional space such that a plurality of candidate dividing lines coincide with sides of the polygons (the step S1). Further, the association data 67 in which a position on the original image is associated with each top of the plurality of polygons is stored in the main memory 32, and in the processing of displaying the original image (the step S33), the CPU 31 displays the original image on the screen by drawing the object 71 using the original image as a texture in accordance with the associations in the association data 67. As described above, by executing the three-dimensional image processing using the original image as a texture, in the processing of changing the original image for obtaining an image (a symmetrical image) which is line symmetrical about the dividing line (the step S5), the CPU 31 is capable of easily converting the original image by changing the associations in the association data 67. In an alternative embodiment, as a method of obtaining a symmetrical image from the original image, a method of calculating a color value (e.g. an RGB value and a YUV value) after the change for each pixel of the first area may be used instead of a method using polygons as in the present embodiment. In other words, for obtaining a symmetrical image, the CPU 31 may change a color value of each pixel of the first area such that it is equalized with a color value of a pixel symmetrical to the pixel about the dividing line.

Further, when a plurality of candidate dividing lines are set, it is preferable that any of the dividing lines satisfy a condition that "when the candidate dividing line divides an image area, a position of each top of polygons in a smaller area is symmetrical to a position of any one of tops of polygons in a larger area (about the candidate dividing line)". More specifically, in the present embodiment, a plurality of candidate dividing lines include a plurality of straight lines located in a lattice-like pattern on the screen, and a plurality of straight lines extending through intersections (lattice points) among the plurality of straight lines and intersecting with the plurality of straight lines at an angle of 45 degrees (FIG. 7). In an alternative embodiment, straight lines extending through the above lattice points and intersecting with the plurality of straight lines located in a lattice-like pattern on the screen at an angle other than 45 degrees may set as candidate dividing lines. However, in this case, the straight lines do not satisfy the above condition.

When a plurality of candidate dividing lines are set so as to satisfy the above condition, in changing the associations in the association data 67 for generating the symmetrical image, the CPU 31 may change a position on the original image which is associated with a top to a position on the original image which is associated with another top. In other word, the position on the original image after the change is obtained by copying a known position on the original image, and thus processing of calculating the position on the original image after the change is significantly facilitated. In an alternative embodiment, candidate dividing lines which do not satisfy the above condition may be set. In this case, a position on the original image after the change does not become a position on the original image which is associated with any top, and thus calculation processing becomes complicated as compared with the case where the candidate dividing lines satisfy the above condition.

[Modified Example Concerning Case where Continuity is Not Maintained in Conversion Image]

When the above symmetrical image is obtained as a conversion image, it is preferable that like the candidate dividing lines as shown in FIG. 7, candidate dividing lines be set such that continuity of a conversion image is maintained. In an alternative embodiment, a dividing line may be set such that continuity of a conversion image is not maintained. In this case, the following processing may be executed.

Figure 17:
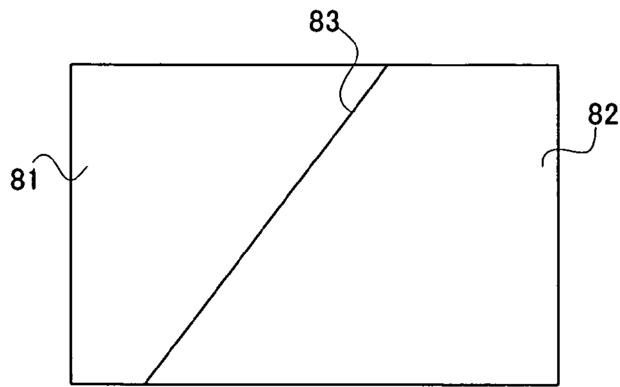
FIG. 17 is a view showing an image area in which a dividing line is set such that continuity of a conversion image is not maintained.
Figure 18:
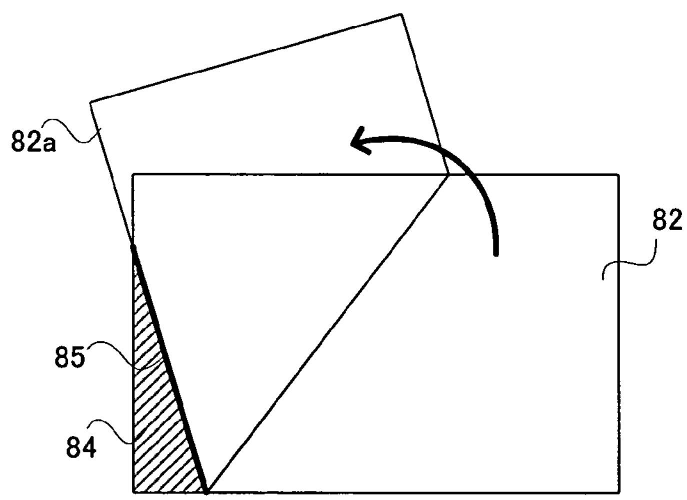
FIG. 18 is a view showing an image area when a second area 82 is inverted about a dividing line 83.
Figure 19:
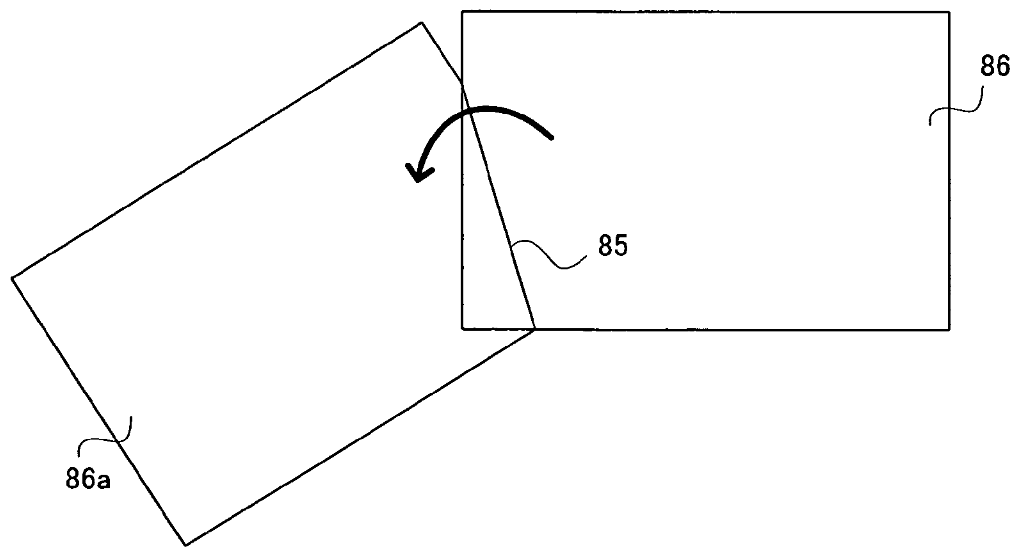
FIG. 19 is a view showing an image area when a new second area 86 is inverted about a dividing line 85.

FIGS. 17 to 19 are views for explaining an outline of image conversion processing in a modified example of the present embodiment. FIG. 17 is a view showing an image area in which a dividing line is set such that continuity of a conversion image is not maintained. As shown in FIG. 17, an image area of an original image is divided by a dividing line 83 into a first area 81 and a first area 82. FIG. 18 is a view showing an image area when the first area 82 is inverted about the dividing line 83. When the first area 82 is inverted about the dividing line 83, as shown in FIG. 18, an inverted area 82*a* cannot covert an entirety of the first area 81. In other words, a remaining area 84 which does not overlap with the inverted area 82*a* is formed in the first area 81. At this time, continuity of the image is lost at a boundary line 85 included in the first area 81 among boundary lines of the inverted area 82*a*.

When the remaining area 84 is formed, in the present modified example, the CPU 31 further executes image change processing. More specifically, the CPU 31 executes the image change processing with the boundary line 85 used as a new dividing line. At this time, the remaining area 84 becomes a new first area, and an area 86 other than the remaining area 84 becomes a new second area. FIG. 19 is a view showing an image area when the new second area 86 is inverted about the dividing line 85. As shown in FIG. 19, by inverting the new second area 86 about the dividing line 85, an image of the remaining area 84 is changed to an image obtained by inverting an image of the new second area 86. Thus, continuity of the image is maintained even at the dividing line 85. It is noted that if an area 86*a* obtained by inverting the new second area 86 does not cover an entirety of the remaining area 84, the image change processing is repeatedly executed until a remaining area is not formed.

Figure 20:
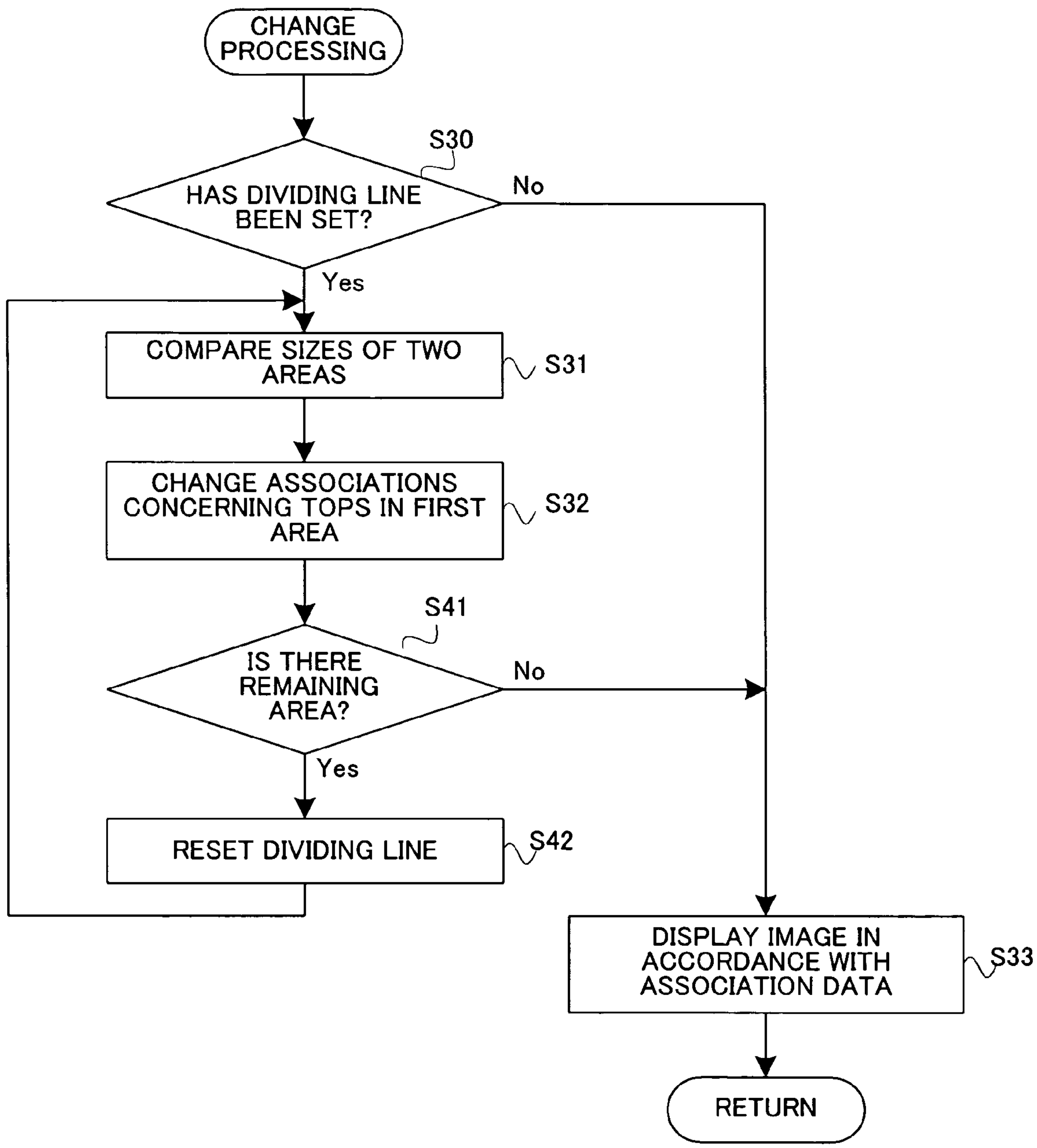
FIG. 20 is a flow chart showing a procedure of change processing in a modified example of the present embodiment.

FIG. 20 is a flow chart showing a procedure of the change processing in the modified example of the present embodiment. In FIG. 20, the same steps as those in FIG. 14 are designated by the same step numerals, and the description thereof will be omitted.

In the present modified example, subsequent to processing at a step S32, processing at a step S41 is executed. More specifically, at the step S41, the CPU 31 determines whether or not there is a remaining area in a conversion image which is generated in accordance with associations after the processing at the step S32. The determination can be made by referring to the association data 67 changed at the step S32. When a result of the determination at the step S41 is positive, processing at a step S42 is executed. On the other hand, when the result of the determination at the step S41 is negative, processing at a step S33 is executed.

At the step S42, the CPU 31 resets a dividing line. More specifically, the boundary line included in the first area among the boundary lines of the image of the second area in the conversion image which is generated in accordance with the associations after the processing at the last step S32 is set as a new dividing line. Subsequent to the step S42, processing at a step S31 is executed again. In other words, the association data 67 is updated again by using the reset dividing line. The CPU 31 repeatedly executes the processing at the steps S31, S32, S41, and S42 until there is no remaining area.

As described above, according to the present modified example, a conversion image finally generated has continuity, and thus a dividing line (a candidate dividing line) can be freely set. The present modified embodiment is particularly useful in the case where the user is made to freely set a dividing line without using candidate dividing lines (in the case where a line drawn by the user is set as a dividing line without change, and the like; its details will be described later).

[Modified Example Concerning Dividing Line]

In the above embodiment, a dividing line (a candidate dividing line) is a straight line. However, in an alternative embodiment, a dividing line is not limited to a straight line, and may be a curved line. For example, a line drawn by the user with the touch panel 13 may be used as a dividing line without change. When the dividing line is not a straight line, a conversion image may be generated by the following manners.

Figure 21:
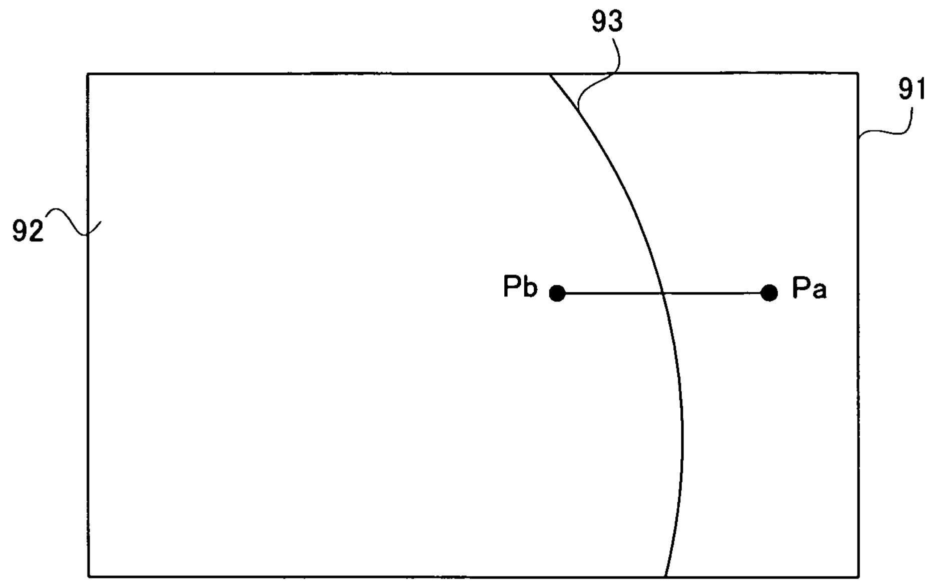
FIG. 21 is a view for explaining a first method.

A first manner is to generate a conversion image such that it is symmetrical only about a predetermined direction. FIG. 21 is a view for explaining the first manner. In FIG. 21, an image area is divided by a dividing line 93 into a first area 91 and a second area 92. In the first manner, as shown in FIG. 21, a color value of a pixel Pa in the first area 91 is changed to a color value of a pixel Pb (in the second area 92) symmetrical to the Pixel Pa about the dividing line 93 in a predetermined direction (here, in a lateral direction of the image).

Figure 22:
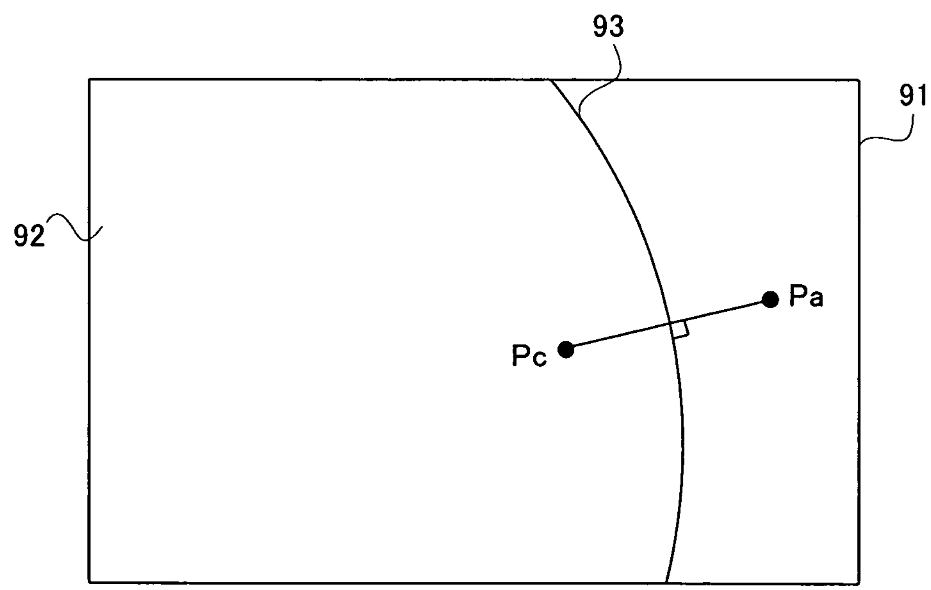
FIG. 22 is a view for explaining a second method.

A second manner is to generate a conversion image such that it is symmetrical only about a normal direction of the dividing line. FIG. 22 is a view for explaining the second manner. In the second manner, as shown in FIG. 22, the color value of the pixel Pa in the first area 91 is changed to a color value of a pixel Pc symmetrical to the pixel Pa about a normal line extending through the pixel Pa among normal lines of the dividing line 93.

[Modified Example Concerning Input Manner]

In the above embodiment, the touch panel 13 is used as an input device for setting a dividing line. However, the input device may be (A) a pointing device (including a touch panel) capable of performing an input for designating a position on the screen of the display device, (B) a button for designating or determining a dividing line among candidate dividing lines, (C) an input device capable of designating a position and a direction on the screen, and the like.

In the case of using the pointing device of the above (A), a dividing line can be set based on an input position (on the screen) which is designated by the pointing device. For example, similarly as in the above embodiment, a dividing line can be selected among candidate dividing lines based on two input positions on the screen which are inputted by the pointing device. An operation for inputting two input positions may be an operation of drawing a line as in the above embodiment, or an operation of individually designating (touching) two points. In the case where the user is made to perform the former operation, the game apparatus may use an initial point and an endpoint of a line as two input positions. In the case where the user is made to perform the latter operation, the game apparatus may use two positions designated by the user as two input positions. Further, in the case of using the pointing device, a dividing line can be obtained based on an input position without using candidate dividing lines. More specifically, a line drawn by the pointing device may be set as a dividing line without change, or a straight line (or a curved line) approximating the line may be calculated as a dividing line. Further, a straight line extending through the above two input positions can be set as a dividing line. It is noted that in addition to the touch panel, the pointing device includes an input device (a mouse, the direction input button 14A, and the like) capable of moving a cursor displayed on the screen.

In the case of using the button of the above (B), a dividing line can be set by using a method of selecting a dividing line among candidate dividing lines. More specifically, a designation change button may be pressed to change a candidate dividing line designated among candidate dividing lines, and a selection determination button may be pressed to select a currently designated candidate dividing line as a dividing line.

In the case of using the input device of the above (C) capable of designating a position and a direction on the screen, the game apparatus 10 may set, as a dividing line, a straight line extending through a position designated by the input device and tilted in accordance with a direction designated by the input device, or may set, as a dividing line, a line close to a position and a direction designated by the input device among the candidate dividing lines. It is noted that concerning the input device capable of designating a position and a direction on the screen, a manner using an input device including imaging means is considered. More specifically, an image of a predetermined object (e.g. a marker such as an LED, and the like which is set in the vicinity of the user) whose image is to be taken is taken by the imaging means, and a position on the screen to which the input device is pointed (to be exact, a position of an intersection between the screen and an imaging direction of the imaging means) can be calculated based on a position and a tilt of the image of the object in the taken image. Further, a tilt (a direction) of the input device can be calculated based on the tilt of the image of the object in the taken image.

As described above, the present embodiment is applicable to, for example, a game apparatus in order to allow the user to freely set a line for dividing an image, thereby obtaining various images as images after conversion.

While the example embodiment presented herein has been described in detail, the foregoing description is in all aspects illustrative and not restrictive. It is understood that numerous other modifications and variations can be devised without departing from the scope of the embodiment.

What is claimed is:

1. A non-transitory storage medium storing an image conversion program which is executed by a computer of an image conversion apparatus which converts an image and displays a converted image on a display device, the image conversion program causing the computer to execute:

displaying an original image before conversion on the display device;

dividing line setting for dividing an area of an image displayed on the display device into a first area and a second area; and a change for converting the original image by changing at least a part of an image of the first area to an image generated from an image of the second area, and displaying an image after the conversion on the display device, wherein the image conversion apparatus includes a pointing device capable of performing an input for designating a position on a screen of the display device, the image conversion program further causes the computer to execute obtaining an input position inputted by the pointing device, and at the dividing line setting, the computer sets the dividing line based on the input position obtained at the input obtaining, wherein the input obtaining is repeatedly executed every a predetermined time period, and at the dividing line setting, the computer sets the dividing line based on a plurality of input positions continuously obtained at the input obtaining which is executed a plurality of times, and wherein the dividing line setting includes a selection for selecting the dividing line among a plurality of candidate dividing lines on the screen, said candidate dividing lines belonging to a predetermined set of lines along a vertical, a horizontal and a diagonal direction, wherein the selection is based on the plurality of input positions.

2. The non-transitory storage medium according to claim 1, wherein at the selection, the computer calculates a position and a direction on the screen from the plurality of input positions, and selects the dividing line among the candidate dividing lines based on the calculated position and direction.

3. The non-transitory storage medium according to claim 2, wherein the plurality of candidate dividing lines are set so as to extend through lattice points which are arranged on the screen in a lattice-like pattern, and at the selection, the computer selects, among candidate dividing lines extending through a lattice point closest to a first input position among the plurality of input positions, a candidate dividing line having a tilt closest to a tilt of a straight line which connects the first input position and a second input position after the first input position among the plurality of input positions as the dividing line.

4. The non-transitory storage medium according to claim 3, wherein at the selection, the computer sets an input position which is first obtained among the plurality of input positions as the first input position, and sets an input position which is last obtained among the plurality of input positions as the second input position.

5. A non-transitory storage medium storing an image conversion program which is executed by a computer of an image conversion apparatus which converts an image and displays a converted image on a display device, the image conversion program causing the computer to execute:

displaying an original image before conversion on the display device;

dividing line setting for dividing an area of an image displayed on the display device into a first area and a second area; and a change for converting the original image by changing at least a part of an image of the first area to an image generated from an image of the second area, and displaying an image after the conversion on the display device, wherein the dividing line setting includes a selection for selecting the dividing line among a plurality of candidate dividing lines on a screen of the display device, said candidate dividing lines belonging to a predetermined set of lines along a vertical, a horizontal and a diagonal direction, wherein the selection is in accordance with an instruction from the user.

6. The non-transitory storage medium according to claim 5, wherein the image conversion program further causes the computer to execute locating an object composed of a plurality of polygons in a virtual three-dimensional space such that when the object is displayed on the screen, the plurality of candidate dividing lines coincide with sides of the polygons, the image conversion apparatus stores association data in which a position on the original image is associated with each top of the plurality of polygons, at the original image displaying, the computer displays the original image by drawing the object using the original image as a texture in accordance with associations in the association data, and at the change, the computer converts the original image by changing the associations in the association data.

7. The non-transitory storage medium according to claim 6, wherein the plurality of candidate dividing lines are straight lines, and set such that when an image area is divided by any candidate dividing line, a position of each top of the polygons in a smaller area is line symmetrical to any of positions of tops of the polygons in a larger area about the candidate dividing line, and at the change, the computer changes the associations such that an image after the conversion is line symmetrical about the dividing line.

8. The non-transitory storage medium according to claim 5, wherein the plurality of candidate dividing lines are straight lines, and set such that when at least one of two areas divided by any candidate dividing line is inverted about the candidate dividing line, the inverted area covers an entirety of the other area, and at the change, the computer converts the image of the first area such that an image after the conversion is line symmetrical about the dividing line.

9. A method for converting an image and displaying a converted image on a display device, the method comprising:

displaying an original image before conversion on the display device;

dividing an area of an image displayed on the display device into a first area and a second area; and converting the original image by changing at least a part of an image of the first area to an image generated from an image of the second area, and displaying an image after the conversion on the display device, wherein the dividing includes selecting a dividing line among a plurality of candidate dividing lines on a screen of the display device, said candidate dividing lines belonging to a predetermined set of lines along a vertical, a horizontal and a diagonal direction, wherein the selection is in accordance with an instruction from the user.

10. An image conversion apparatus for converting an image and displaying a converted image on a display device, the image conversion apparatus comprising:

an original image display unit for displaying an original image before conversion on the display device;

a dividing line setting unit for setting a dividing line for dividing an area of an image displayed on the display device into a first area and a second area; and a change unit for converting the original image by changing at least a part of an image of the first area to an image generated from an image of the second area, and displaying an image after the conversion on the display device, wherein the dividing line setting unit selects the dividing line among a plurality of candidate dividing lines on a screen of the display device, said candidate dividing lines belonging to a predetermined set of lines along a vertical, a horizontal and a diagonal direction, wherein the selection is in accordance with an instruction from the user.

* * * * *